(12) United States Patent
Friend et al.

(10) Patent No.: US 10,822,713 B2
(45) Date of Patent: \*Nov. 3, 2020

(54) STRUCTURED PARTICLES

(71) Applicant: NEXEON LIMITED, Oxfordshire (GB)

(72) Inventors: Chris Friend, Oxfordshire (GB); William James Macklin, Oxfordshire (GB); Yuxiong Jiang, Oxfordshire (GB); Mamdouh Elsayed Abdelsalam, Hampshire (GB); Fengming Liu, Greater London (GB); Phil Rayner, Cambridgeshire (GB)

(73) Assignee: Nexeon Limited, Oxfordshire (GB)

( \* ) Notice: Subject to any disclaimer, the term of this patent is extended or adjusted under 35 U.S.C. 154(b) by 125 days.

This patent is subject to a terminal disclaimer.

(21) Appl. No.: 16/100,752

(22) Filed: Aug. 10, 2018

(65) Prior Publication Data

US 2019/0119826 A1    Apr. 25, 2019

Related U.S. Application Data

(63) Continuation of application No. 14/128,365, filed as application No. PCT/GB2012/051475 on Jun. 22, 2012, now Pat. No. 10,077,506.

(30) Foreign Application Priority Data

Jun. 24, 2011 (GB) .................................. 1110785.1

(51) Int. Cl.
*H01M 4/134* (2010.01)
*H01M 4/1395* (2010.01)
(Continued)

(52) U.S. Cl.
CPC ............. *C25F 3/02* (2013.01); *H01M 4/0402* (2013.01); *H01M 4/0492* (2013.01);
(Continued)

(58) Field of Classification Search
CPC .. H01M 4/0404; H01M 4/0492; H01M 4/134; H01M 4/1395; H01M 4/364; H01M 4/386; H01M 4/387; H01M 4/463
See application file for complete search history.

(56) References Cited

U.S. PATENT DOCUMENTS 4,002,541 A    1/1977 Streander
4,192,720 A    3/1980 Bucker et al.
(Continued)

FOREIGN PATENT DOCUMENTS

CN    1569623 A    1/2005
CN    1967910 A    5/2007
(Continued)

OTHER PUBLICATIONS

Abel, P. R. et al., Improving the Stability of Nanostructured Silicon Thin Film Lithium-Ion Battery Anodes through Their Controlled Oxidation, ACS Nano, 6(3):2506-2516, (2012).
(Continued)

*Primary Examiner* — James Lee
(74) *Attorney, Agent, or Firm* — William R. Haulbrook; Michael D. Schmitt; Choate, Hall & Stewart LLP

(57) ABSTRACT

A powder comprising pillared particles for use as an active component of a metal ion battery, the pillared particles comprising a particle core and a plurality of pillars extending from the particle core, wherein the pillared particles are formed from a starting material powder wherein at least 10% of the total volume of the starting material powder is made up of starting material particles having a particle size of no more than 10 microns.

25 Claims, 20 Drawing Sheets

(51) Int. Cl.

| | | |
|---|---|---|
| *C25F 3/02* | (2006.01) | |
| *H01M 4/133* | (2010.01) | |
| *H01M 4/1393* | (2010.01) | |
| *H01M 4/38* | (2006.01) | |
| *H01M 4/587* | (2010.01) | |
| *H01M 10/0525* | (2010.01) | |
| *H01M 4/36* | (2006.01) | |
| *H01M 4/62* | (2006.01) | |
| *H01M 4/04* | (2006.01) | |
| *H01M 4/136* | (2010.01) | |
| *H01M 4/1397* | (2010.01) | |
| *H01M 4/583* | (2010.01) | |
| *H01M 4/02* | (2006.01) | |

(52) U.S. Cl.
CPC .......... *H01M 4/133* (2013.01); *H01M 4/134* (2013.01); *H01M 4/136* (2013.01); *H01M 4/1393* (2013.01); *H01M 4/1395* (2013.01); *H01M 4/1397* (2013.01); *H01M 4/362* (2013.01); *H01M 4/364* (2013.01); *H01M 4/386* (2013.01); *H01M 4/387* (2013.01); *H01M 4/583* (2013.01); *H01M 4/587* (2013.01); *H01M 4/625* (2013.01); *H01M 10/0525* (2013.01); *H01M 4/0404* (2013.01); *H01M 4/0428* (2013.01); *H01M 2004/027* (2013.01)

(56) References Cited

U.S. PATENT DOCUMENTS

| | | |
|---|---|---|
| 4,363,708 A | 12/1982 | Rauchle et al. |
| 4,686,013 A | 8/1987 | Pensabene et al. |
| 5,395,711 A | 3/1995 | Tahara et al. |
| 5,514,495 A | 5/1996 | Klaus |
| 5,658,691 A | 8/1997 | Suzuki et al. |
| 5,914,183 A | 6/1999 | Canham |
| 6,132,724 A | 10/2000 | Blum |
| 6,190,951 B1 | 2/2001 | Nakahori et al. |
| 6,334,939 B1 | 1/2002 | Zhou et al. |
| 6,514,395 B2 | 2/2003 | Zhou et al. |
| 7,138,208 B2 | 11/2006 | Tanjo et al. |
| 7,244,513 B2 | 7/2007 | Li et al. |
| 7,311,999 B2 | 12/2007 | Kawase et al. |
| 7,332,339 B2 | 2/2008 | Canham |
| 7,402,829 B2 | 7/2008 | Green |
| 7,479,351 B2 | 1/2009 | Matsubara et al. |
| 7,615,206 B2 | 11/2009 | Sandhage et al. |
| 7,638,239 B2 | 12/2009 | Sato et al. |
| 7,713,849 B2 | 5/2010 | Habib et al. |
| 7,824,801 B2 | 11/2010 | Kogetsu et al. |
| 7,851,086 B2 | 12/2010 | Matsubara et al. |
| 7,879,734 B2 | 2/2011 | Fukutani et al. |
| 8,080,337 B2 | 12/2011 | Higuchi et al. |
| 8,526,166 B2 | 9/2013 | Choi et al. |
| 8,585,918 B2 | 11/2013 | Green et al. |
| 8,597,831 B2 | 12/2013 | Green et al. |
| 8,772,174 B2 | 7/2014 | Green et al. |
| 8,940,192 B2 | 1/2015 | Toyokawa |
| 8,940,437 B2 | 1/2015 | Green et al. |
| 8,945,431 B2 | 2/2015 | Schulz et al. |
| 9,252,426 B2 | 2/2016 | Green |
| 9,548,489 B2 | 1/2017 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,388,948 B2 | 8/2019 | Abdelsalam et al. |
| 2001/0044045 A1 | 11/2001 | Sato et al. |
| 2002/0037433 A1 | 3/2002 | Rasmussen et al. |
| 2002/0074972 A1 | 6/2002 | Narang et al. |
| 2002/0121460 A1 | 9/2002 | Moy et al. |
| 2002/0148727 A1 | 10/2002 | Zhou et al. |
| 2002/0164479 A1 | 11/2002 | Matsubara et al. |
| 2003/0054250 A1 | 3/2003 | Kweon et al. |
| 2003/0099883 A1 | 5/2003 | Ochoa et al. |
| 2003/0150378 A1 | 8/2003 | Winterton et al. |
| 2003/0215711 A1 | 11/2003 | Aramata et al. |
| 2004/0052867 A1 | 3/2004 | Canham |
| 2004/0062990 A1 | 4/2004 | Shimamura et al. |
| 2004/0140222 A1 | 7/2004 | Smedley et al. |
| 2004/0166319 A1 | 8/2004 | Li et al. |
| 2004/0214085 A1 | 10/2004 | Sheem et al. |
| 2005/0031958 A1 | 2/2005 | Fukuoka et al. |
| 2005/0186378 A1 | 8/2005 | Bhatt |
| 2005/0186474 A1 | 8/2005 | Jiang et al. |
| 2005/0233213 A1 | 10/2005 | Lee et al. |
| 2006/0019151 A1 | 1/2006 | Imachi et al. |
| 2006/0099495 A1 | 5/2006 | Suzuki et al. |
| 2006/0147802 A1 | 7/2006 | Yasuda et al. |
| 2006/0166098 A1 | 7/2006 | Tabuchi et al. |
| 2006/0216603 A1 | 9/2006 | Choi |
| 2006/0251561 A1 | 11/2006 | Farrell et al. |
| 2007/0011102 A1 | 1/2007 | Matsuhira et al. |
| 2007/0020521 A1 | 1/2007 | Obrovac et al. |
| 2007/0031733 A1 | 2/2007 | Kogetsu et al. |
| 2007/0054190 A1 | 3/2007 | Fukui et al. |
| 2007/0077490 A1 | 4/2007 | Kim et al. |
| 2007/0099081 A1 | 5/2007 | Matsuda et al. |
| 2007/0105017 A1 | 5/2007 | Kawase et al. |
| 2007/0111101 A1 | 5/2007 | Ohkubo et al. |
| 2007/0111102 A1 | 5/2007 | Inoue et al. |
| 2007/0122708 A1 | 5/2007 | Shimamura et al. |
| 2007/0224508 A1 | 9/2007 | Aramata et al. |
| 2007/0255198 A1 | 11/2007 | Leong et al. |
| 2007/0281216 A1 | 12/2007 | Petrat et al. |
| 2008/0038170 A1 | 2/2008 | Sandhage et al. |
| 2008/0062616 A1 | 3/2008 | Matsuda et al. |
| 2008/0090152 A1 | 4/2008 | Kosuzu et al. |
| 2008/0096110 A1 | 4/2008 | Bito et al. |
| 2008/0113269 A1 | 5/2008 | Yamamoto et al. |
| 2008/0124631 A1 | 5/2008 | Fukui et al. |
| 2008/0145752 A1 | 6/2008 | Hirose et al. |
| 2008/0145757 A1 | 6/2008 | Mah et al. |
| 2008/0166474 A1 | 7/2008 | Deguchi et al. |
| 2008/0261112 A1 | 10/2008 | Nagata et al. |
| 2008/0280207 A1 | 11/2008 | Patoux et al. |
| 2008/0305395 A1 | 12/2008 | Hirose et al. |
| 2009/0004566 A1 | 1/2009 | Shirane et al. |
| 2009/0004568 A1 | 1/2009 | Hirose et al. |
| 2009/0010833 A1 | 1/2009 | Rosenband et al. |
| 2009/0137688 A1 | 5/2009 | Yang |
| 2009/0143227 A1 | 6/2009 | Dubrow et al. |
| 2009/0169985 A1 | 7/2009 | Yamaguchi et al. |
| 2009/0186267 A1 | 7/2009 | Tiegs |
| 2009/0239151 A1 | 9/2009 | Nakanishi et al. |
| 2009/0246628 A1 | 10/2009 | Adachi et al. |
| 2009/0253033 A1 | 10/2009 | Hirose et al. |
| 2009/0301866 A1 | 12/2009 | Zaghib et al. |
| 2010/0008841 A1 | 1/2010 | Rosenkilde |
| 2010/0009261 A1 | 1/2010 | Watanabe |
| 2010/0112442 A1 | 5/2010 | Fujikawa et al. |
| 2010/0112451 A1 | 5/2010 | Shibutani et al. |
| 2010/0112475 A1 | 5/2010 | Natsume et al. |
| 2010/0143773 A1 | 6/2010 | Honbou |
| 2010/0143798 A1 | 6/2010 | Zhamu et al. |
| 2010/0178565 A1 | 7/2010 | Green |
| 2010/0190061 A1 | 7/2010 | Green |
| 2010/0190062 A1 | 7/2010 | Yamamoto et al. |
| 2010/0196760 A1 | 8/2010 | Green |
| 2010/0243951 A1 | 9/2010 | Watanabe et al. |
| 2010/0266902 A1 | 10/2010 | Takano et al. |
| 2010/0278931 A1 | 11/2010 | Ashton et al. |
| 2010/0285358 A1 | 11/2010 | Cui et al. |
| 2010/0285367 A1 | 11/2010 | Matsui et al. |
| 2010/0291441 A1 | 11/2010 | Ugaji et al. |
| 2010/0297502 A1 | 11/2010 | Zhu et al. |
| 2010/0330418 A1 | 12/2010 | Liang et al. |
| 2010/0330425 A1 | 12/2010 | Lopatin et al. |
| 2011/0001097 A1 | 1/2011 | Aramata et al. |
| 2011/0008531 A1 | 1/2011 | Mikhaylik et al. |
| 2011/0027537 A1 | 2/2011 | Inoue et al. |
| 2011/0039690 A1 | 2/2011 | Niu |

(56) References Cited

U.S. PATENT DOCUMENTS

| | | |
|---|---|---|
| 2011/0056563 A1 | 3/2011 | Bari |
| 2011/0067228 A1 | 3/2011 | Green |
| 2011/0076560 A1 | 3/2011 | Scordilis-Kelley et al. |
| 2011/0085960 A1 | 4/2011 | Mukasyan et al. |
| 2011/0104480 A1 | 5/2011 | Malekos et al. |
| 2011/0111135 A1 | 5/2011 | Kamiyama et al. |
| 2011/0111279 A1 | 5/2011 | Smithyman et al. |
| 2011/0111294 A1 | 5/2011 | Lopez et al. |
| 2011/0123866 A1 | 5/2011 | Pan et al. |
| 2011/0163274 A1 | 7/2011 | Plee et al. |
| 2011/0236493 A1 | 9/2011 | Canham et al. |
| 2011/0244328 A1 | 10/2011 | Iriyama et al. |
| 2011/0250498 A1 | 10/2011 | Green et al. |
| 2011/0256452 A1 | 10/2011 | Cho et al. |
| 2011/0269019 A1 | 11/2011 | Green et al. |
| 2011/0281180 A1 | 11/2011 | Kim et al. |
| 2011/0287318 A1 | 11/2011 | Loveness et al. |
| 2011/0299223 A1 | 12/2011 | Oh et al. |
| 2011/0311873 A1 | 12/2011 | Schulz et al. |
| 2012/0040242 A1 | 2/2012 | Kurasawa et al. |
| 2012/0094178 A1 | 4/2012 | Loveridge et al. |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0141872 A1 | 6/2012 | Kim et al. |
| 2012/0171566 A1 | 7/2012 | Yoshitake et al. |
| 2012/0202112 A1 | 8/2012 | Yushin et al. |
| 2012/0255858 A1 | 10/2012 | Maeshima et al. |
| 2012/0315543 A1 | 12/2012 | Wata et al. |
| 2013/0040199 A1 | 2/2013 | Yamamura |
| 2013/0071750 A1 | 3/2013 | Park et al. |
| 2013/0115517 A1 | 5/2013 | Kim et al. |
| 2013/0136986 A1 | 5/2013 | Scoyer et al. |
| 2013/0157127 A1 | 6/2013 | Hirose et al. |
| 2013/0196158 A1 | 8/2013 | Yoshida et al. |
| 2013/0216907 A1 | 8/2013 | Rayner et al. |
| 2013/0224583 A1 | 8/2013 | Green |
| 2013/0224606 A1 | 8/2013 | Koh et al. |
| 2013/0266865 A1 | 10/2013 | Kwon et al. |
| 2013/0337314 A1 | 12/2013 | Essaki et al. |
| 2014/0021415 A1 | 1/2014 | Kang et al. |
| 2014/0023928 A1 | 1/2014 | Jeon et al. |
| 2014/0050987 A1 | 2/2014 | Park et al. |
| 2014/0087268 A1 | 3/2014 | Kim et al. |
| 2014/0106230 A1 | 4/2014 | Kim et al. |
| 2014/0147751 A1 | 5/2014 | Yang et al. |
| 2014/0162131 A1 | 6/2014 | Friend et al. |
| 2014/0170303 A1 | 6/2014 | Rayner et al. |
| 2014/0193711 A1 | 7/2014 | Biswal et al. |
| 2014/0235884 A1 | 8/2014 | Veinot et al. |
| 2014/0246398 A1 | 9/2014 | Zaghib et al. |
| 2014/0302396 A1 | 10/2014 | Lu et al. |
| 2014/0349183 A1 | 11/2014 | Macklin et al. |
| 2014/0349187 A1 | 11/2014 | Hirose et al. |
| 2015/0037673 A1 | 2/2015 | Zaghib et al. |
| 2015/0044571 A1 | 2/2015 | Abdelsalam et al. |
| 2015/0079472 A1 | 3/2015 | Lin et al. |
| 2015/0104705 A1 | 4/2015 | Canham et al. |
| 2015/0221936 A1 | 8/2015 | Huang |
| 2015/0280221 A1 | 10/2015 | Abdelsalam et al. |
| 2015/0303456 A1 | 10/2015 | Yoo et al. |
| 2015/0380735 A1 | 12/2015 | Tuduki et al. |
| 2016/0126538 A1 | 5/2016 | Hanelt et al. |
| 2016/0172670 A1 | 6/2016 | Friend |
| 2016/0197342 A1 | 7/2016 | Lee et al. |
| 2016/0308205 A1 | 10/2016 | Canham et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0047581 A1 | 2/2017 | Lu et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0083263 A1 | 3/2018 | Cho et al. |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 103 165 870 A | 6/2013 |
| CN | 103 633 295 A | 3/2014 |
| CN | 103840140 A | 6/2014 |
| CN | 104103807 A | 10/2014 |
| CN | 105742611 A | 7/2016 |
| EP | 0281115 A2 | 9/1988 |
| EP | 1054462 A1 | 11/2000 |
| EP | 1335438 A1 | 8/2003 |
| EP | 1396894 A2 | 3/2004 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2533331 B1 | 8/2015 |
| EP | 3093910 A1 | 11/2016 |
| GB | 980513 A | 1/1965 |
| GB | 2000191 A | 1/1979 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2001-266866 A | 9/2001 |
| JP | 2002-151055 A | 5/2002 |
| JP | 2003-077463 A | 3/2003 |
| JP | 2003-100296 A | 4/2003 |
| JP | 2003-303586 A | 10/2003 |
| JP | 2004-185984 A | 7/2004 |
| JP | 2004/214054 A | 7/2004 |
| JP | 2004281317 A | 10/2004 |
| JP | 2004-311429 A | 11/2004 |
| JP | 2005-63955 A | 3/2005 |
| JP | 2005-259697 A | 9/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-128766 A | 5/2007 |
| JP | 2007-220585 A | 8/2007 |
| JP | 2007-294423 A | 11/2007 |
| JP | 2007-335283 A | 12/2007 |
| JP | 2007318057 A | 12/2007 |
| JP | 2007335198 A | 12/2007 |
| JP | 2008-004460 A | 1/2008 |
| JP | 2008-166013 A | 7/2008 |
| JP | 2008186732 A | 8/2008 |
| JP | 4171904 B2 | 10/2008 |
| JP | 2008-293872 A | 12/2008 |
| JP | 2008305746 A | 12/2008 |
| JP | 2010-021100 A | 1/2010 |
| JP | 4401984 B2 | 1/2010 |
| JP | 2010-080196 A | 4/2010 |
| JP | 2010-218848 A | 9/2010 |
| JP | 2010205609 A | 9/2010 |
| JP | 2011-009228 A | 1/2011 |
| JP | 2011-142021 A | 7/2011 |
| JP | 2011-192629 A | 9/2011 |
| JP | 2011/198614 A | 10/2011 |
| JP | 2012-009457 A | 1/2012 |
| JP | 2012-033317 A | 2/2012 |
| JP | 2012084521 A | 4/2012 |

(56) References Cited

FOREIGN PATENT DOCUMENTS

| | | |
|---|---|---|
| JP | 2012084522 A | 4/2012 |
| JP | 2012-178269 A | 9/2012 |
| JP | 2013/008585 A | 1/2013 |
| JP | 2013-131324 A | 7/2013 |
| JP | 2013-131325 A | 7/2013 |
| JP | 2014/082118 A | 5/2014 |
| KR | 2003-0028241 A | 4/2003 |
| KR | 100 578 871 B1 | 5/2006 |
| KR | 2008-0091883 A | 10/2008 |
| KR | 2011-0116585 A | 10/2011 |
| KR | 2012-0089512 A | 8/2012 |
| KR | 2012-0093756 A | 8/2012 |
| KR | 10-1204192 B1 | 11/2012 |
| KR | 2012-0120034 A | 11/2012 |
| KR | 2013-0031778 A | 3/2013 |
| KR | 2013-0050704 A | 5/2013 |
| KR | 2013 0107892 A | 10/2013 |
| KR | 2013-0114007 A | 10/2013 |
| KR | 10-1341951 B1 | 12/2013 |
| KR | 2013-0139554 A | 12/2013 |
| KR | 2014-0012351 A | 2/2014 |
| KR | 2014-0022679 A | 2/2014 |
| KR | 20140070227 A | 6/2014 |
| KR | 2014-0100514 A | 8/2014 |
| KR | 10-1441447 B1 | 9/2014 |
| SU | 471402 A1 | 5/1975 |
| SU | 544019 A1 | 1/1977 |
| WO | WO-97/01193 A1 | 1/1997 |
| WO | WO-2004/049473 A2 | 6/2004 |
| WO | WO-2004/086539 A1 | 10/2004 |
| WO | WO-2005/075048 A1 | 8/2005 |
| WO | WO-2005/096414 A2 | 10/2005 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/089018 A2 | 7/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/028858 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2013/179068 A3 | 1/2014 |
| WO | WO-2014/068318 A1 | 5/2014 |
| WO | WO-2014/156117 A1 | 10/2014 |
| WO | WO-2015/03996 A1 | 1/2015 |
| WO | WO-2015/041450 A1 | 3/2015 |
| WO | WO-2015/082920 A1 | 6/2015 |
| WO | WO-2015/157358 A1 | 10/2015 |
| WO | WO-2016/102098 A1 | 6/2016 |
| WO | WO-2016/102208 A1 | 6/2016 |
| WO | WO-2016/174023 A1 | 11/2016 |

OTHER PUBLICATIONS

Jung, S. C. et al., Anisotropic Volume Expansion of Crystalline Silicon during Electrochemical Lithium Insertion: An Atomic Level Rationale, Nano Letters, 12:5342-5347, (2012).

Liu and Xu, Solution to Homework Assignment #1, University of California, 2 pages, (2013).

Park, M. H. et al., Silicon Nanotube Battery Anodes, Nano Letters, 9(11):3844-3847 (2009).

Stoemenos, J. et al., Silicon on Insulator Obtained by High Dose Oxygen Implantation, Microstructure, and Formation Mechanism, J. Electrochem. Soc., 142(4):1248-1260, (1995).

Su, L. et al., Core Double-shell Si@SiO$_2$@C nanocomposites as anode materials for Li-ion batteries, Chemical Communication, 46:2590-2592 (2010).

Xu, R. et al., Comparison of sizing small particles using different technologies, Powder Technology, 132:145-153, (2003).

Bang, B.M. et al., Scalable Approach to Multi-Dimensional Bulk Si Anodes via Metal-Assisted Chemical Etching, Energy & Environmental Science, 4:5013-5019 (2011).

Chartier, C. et al., Metal-assisted chemical etching of silicon in HF—H2O2, Electrochimica Acta, 53(17):5509-5516 (2008).

Chen et al., Mesoporous Silicon Anodes Prepared by Magnesiothermic Reduction for Lithium Ion Batteries, Journal of the Electrochemical Society, 158(9):A1055-A1059 (2011).

Chen, X. et al., A Patterned 3D Silicon Anode Fabricated by Electrodeposition on a Virus-Structured Current Collector, Advanced Function Materials, 21:380-387 (2011).

Choi et al., Silica nanofibres from electrospinning/sol-gel process, J. Mater. Sci. Letters, 22:891-893 (2003).

Cui, et al. Doping and Electrical Transport in Silicon Nanowires, Journal of Physical Chemistry, 104(22):5213-5216 (2000).

Cullis et al., Structural and Luminescence properties of porous silicon, Applied Physics Reviews, 82(3):909-965 (1997).

Gao et al., Alloy formation in Nanostructured Silicon, Journal of Advanced Materials, 13(11):816-819 (2001).

Gao, B, Synthesis and Electrochemical Properties of Carbon Nanotubes and Silicon Nanowires, Ph.D. Thesis in Applied and Material Sciences, University of North Carolina Chapel Hill (2001).

GB Patent Application No. 0601319.7, filed Jan. 23, 2006, 14 pages.

Graetz, J. et al., Highly reversible lithium storage in nanostructured silicon, Journal of the Electrochemical Society, 6(9):194-197 (2003).

Hatchard, T. D. and Dahn, J. R., In Situ XRD and Electrochemical Study of the Reaction of Lithium with Amorphous Silicon, Journal of The Electrochemical Society, 151(6):A838-A842 (2004).

Huang, Z. et al., Metal-Assisted Chemical Etching of Silicon: A Review, Adv. Mater. 23:285-308 (2011).

International Search Report, PCT/GB2012/051475, 5 pages (dated Sep. 19, 2012).

Jia et al., Novel Three-Dimensional Mesoporous Silicon for High Power Litium-Ion Battery Anode Material, Advs. Energy Mater., 1:1036-1039 (2011).

Jia et al., Supporting Information for Advs. Energy Mater., DOI: 10.1002/aenm.201100485: Novel Three-Dimensional Mesoporous Silicon for High Power Litium-Ion Battery Anode Material, Advanced Energy Materials, DOI: 10.1002/aenm.201100485, 4 pages, (2011).

Jung, K. H. et al., Developments in Luminescent Porous Si, J. Electrochem. Soc., 140(10):3046-3064 (1993).

Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).

Kuriyama, K. et al., Anomalous electrical resistivity and photovoltaic phenomenon in the fast mixed conductor lithium silicide Li12Si17, Physical Review, 38(18):1436-38 (1988).

Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).

(56) References Cited

OTHER PUBLICATIONS

Li, H. et al., The crystal structural evolution of nano-Si anode caused by lithium insertion and extraction at room temperature, Solid State Ionics 135:181-191 (2000).
Ma et al., Silver nanoparticles decorated, flexible $SiO_2$ nanofibers with long-term antibacterial effect as reusable wound cover, Colloids and Surfaces A: Physicochem. Eng. Aspects 387:57-64 (2011).
Mallet, J. et al., Growth of silicon nanowires of controlled diameters by electrodeposition in ionic liquid at room temperature, Nanoletters, 8(10):3468-3474 (2008).
Meijer, J.A. et al., Electrical resistivity and 7Li Knight shift of liquid Li—Si alloys, J. Phys. Condens. Matter I, 5283-5289 (1989).
Merriam Webster, Definition of Particle, 1 page.
Morales, Alfredo M. and Lieber, Charles M., A Laser Ablation Method for the Synthesis of Crystalline Semiconductor Nanowires, Science, 279(9):208-211 (1998).
Notice of Opposition, EP 2533331 B1, 6 pages, dated May 27, 2016.
Ohara, S. et al., A thin film silicon anode for Li-ion batteries having a very large specific capacity and long cycle life, Journal of Power Sources, (136):303-306 (2004).
Oudenhoven, Jos F. M. et al., All-solid-State Lithium-Ion Microbatteries: A Review of Various Three-Dimensional Concepts, Adv. Energy Mater. 1:10-33 (2011).
Purkid et al., Synthesis and Characterization of $SiO_2$ Nanowires Prepared from Rice Husk Ash, J. Metals, Materials and Minerals, 19(2):33-37 (2009).
Ren, W. et al., Preparation of porous silicon/carbon microspheres as high performance anode materials for lithium ion batteries, Journal of Materials Chemistry A: Materials for Energy and Sustainability, 3(11):5859-5865 (2015).
Richman et al., Ordered Mesoporous Silicon through Magensium Reduction of Polymer Templated Silica Thin Films, Nano Lett., 8(9):3075-3079 (2008).
Robinson, D. and Walsh, F.C., The Performance of a 500 Amp Rotating Cylinder Electrode Reactor. Part 1: Current-Potential Data and Single Pass Studies, Hydrometallurgy, 26:93 (1991).
Rongguan, L. et al., Electrodeposited porous-microspheres Li—Si films as negative electrodes in lithium-ion batteries, Journal of Power Sources, 196(8):3868-3873 (2011).
Schmuck, M. et al, Alloying of electrodeposited silicon with lithium—a principal study of applicability as a node material for lithium ion batteries, J. Solid State Electrochem, 14:2203-2207 (2010).
Search Report, GB1110785.1, 2 pages (dated Jan. 11, 2012).
Shih, S. et al., Transmission electron microscopy study of chemically etched porous Si, Applied Physical Letters, 62(5):467-69 (1993).
Shin, H. C. et al., Nanoporous Structures Prepared by an Electrochemical Deposition Process, Advanced Materials, 15:19, 1610-1614 (2003).
Sinha, S. et al., Synthesis of Silicon Nanowires and Novel Nano-Dendrite Structures, CP544 Electronic Properties of Novel Materials Molecular Nanostructures, 431-436 (2000).
Sinha, S. et al., Synthesis of silicon nanowires and novel nanodendrite structures, Journal of Nanoparticle Research 6: 421-425 (2004).
Tarascon, J M. et al., An update of the Li metal-free rechargeable battery based on $Li_{1+x}Mn_2O_4$ cathodes and carbon anodes, Journal of Power Sources, 43-44:689-700 (1993).
Teschke, O. et al., Test cell simulating the operating conditions of water electrolysers for the evaluation of gas evolving electrocatalysts, Journal of Applied Electrochemistry, 13(3):371-376 (1983).
Van Schalkwijk, Walter A. and Scrosati, Bruno, Advances in Lithium-Ion Batteries (edited 2002 Excerpts).
Wachtler, M. et al., Anodic materials for rechargeable Li-batteries, Journal of Power Sources 105:151-160 (2002).
Wakihara, M., Recent development in lithium ion batteries, Materials Science and Engineering, R33:109-134 (2001).
Webb, P.A. and Orr, C., Modern Methods of Particle Characterization, Micromeritics, 17 pages (1998).
Winter, M. et al., Insertion Electrode Materials for Rechargeable Lithium Batteries, Adv. Mater. 10(10):725-763 (1988).
Winter, Martin and Brodd, Ralph J., Batteries versus Fuel Cells versus Electrochemical Capacitors, Chem. Rev. 104:4245-4269 (2004).
Xiao, et al., Stabilization of Silicon Anode for Li-ion Batteries, Journal of the Electrochemical Society, 157(10):1047-1051 (2010).
Yang, J. et al., Si/c composites for high capacity lithium storage materials, Journal of the Electrochemical Society, 6(8):154-156 (2003).
Yu et al., Reversible Storage of Lithium in Silver-Coated Three-Dimensional Macroporous Silicon, Adv. Mater., 22:2247-2250 (2010).
Zhang et al., Vapor-induced solid-liquid-solid process for silicon-based nanowire growth, Journal of Power Sources 195:1691-1697 (2010).
Zhang, Sheng Shui, A review on electrolyte additives for lithium-ion batteries, Journal of Power Sources, 162:1379-1394 (2006).
Zhou, G. W. et al., Controlled Li doping of Si nanowires by electrochemical insertion methods, Applied Physics Letters, 75(16):2447-2449 (1999).

STRUCTURED PARTICLES

PRIORITY APPLICATIONS

This application is a continuation of U.S. patent application Ser. No. 14/128,365, having a 371(c) date of Feb. 10, 2014, entitled Structured Particles, which is a national stage entry, under 35 U.S.C. § 371, of PCT/GB2012/051475, filed on Jun. 22, 2012, entitled Structured Particles, which claims priority to GB 1110785.1, filed on Jun. 24, 2011, the disclosure of each of which is hereby incorporated by reference herein in its entirety.

FIELD OF THE INVENTION

The present invention relates to particles comprising a core and pillars extending from the core, a method of making said particles and use of said particles in a rechargeable metal ion battery.

BACKGROUND OF THE INVENTION

Rechargeable lithium-ion batteries are extensively used in portable electronic devices such as mobile telephones and laptops, and are finding increasing application in electric or hybrid electric vehicles. However, there is an ongoing need to provide batteries that store more energy per unit mass and/or per unit volume.

The structure of a conventional lithium-ion rechargeable battery cell is shown in FIG. 1. The battery cell includes a single cell but may also include more than one cell. Batteries of other metal ions are also known, for example sodium ion and magnesium ion batteries, and have essentially the same cell structure.

The battery cell comprises a current collector for the anode 10, for example copper, and a current collector for the cathode 12, for example aluminium, which are both externally connectable to a load or to a recharging source as appropriate. A composite anode layer 14 overlays the current collector 10 and a lithium containing metal oxide-based composite cathode layer 16 overlays the current collector 12 (for the avoidance of any doubt, the terms "anode" and "cathode" as used herein are used in the sense that the battery is placed across a load—in this sense the negative electrode is referred to as the anode and the positive electrode is referred to as the cathode).

The cathode comprises a material capable of releasing and reabsorbing lithium ions for example a lithium-based metal oxide or phosphate, $LiCoO_2$, $LiNi_{0.8}Co_{0.15}Al_{0.05}O_2$, $Li-Mn_xNi_xCo_{1-2x}O_2$ or $LiFePO_4$.

A porous plastic spacer or separator 20 is provided between the graphite-based composite anode layer 14 and the lithium containing metal oxide-based composite cathode layer 16. A liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16. The polymer electrolyte material can be a solid polymer electrolyte or a gel-type polymer electrolyte and can incorporate a separator.

When the battery cell is fully charged, lithium has been transported from the lithium containing metal oxide cathode layer 16 via the electrolyte into the anode layer 14. In the case of a graphite-based anode layer, the lithium reacts with the graphite to create the compound, $LiC_6$. The graphite, being the electrochemically active material in the composite anode layer, has a maximum capacity of 372 mAh/g. ("active material" or "electroactive material" as used herein means a material which is able to insert into its structure, and release therefrom, metal ions such as lithium, sodium, potassium, calcium or magnesium during the respective charging phase and discharging phase of a battery. Preferably the material is able to insert and release lithium.)

The use of a silicon-based active anode material is also known in the art. Silicon has a substantially higher maximum capacity than graphite. However, unlike active graphite which remains substantially unchanged during insertion and release of metal ions, the process of insertion of metal ions into silicon results in substantial structural changes, accompanied by substantial expansion. For example, insertion of lithium ions into silicon results in formation of a Si—Li alloy. The effect of Li ion insertion on the anode material is described in, for example, "Insertion Electrode Materials for Rechargeable Lithium Batteries", Winter et al. Adv. Mater. 1988, 10. No. 10, pages 725-763.

WO2009/010758 discloses the etching of silicon powder in order to make silicon material for use in lithium ion batteries. The resulting etched particles contain pillars on their surface. The pillared particles may be fabricated by etching a particle having an initial size of 10 to 1000 microns.

WO 2010/040985 disclosed a method of etching particles having a mean particle diameter in the range of 5-500 microns.

U.S. Pat. No. 7,402,829 discloses etching of a silicon substrate to form an array of silicon pillars extending from the silicon substrate.

JP 2004281317 discloses growth of silicon nanowires by vapour deposition on a substrate for use in a lithium ion battery anode.

US 2010/0285358 discloses silicon nanowires grown on a substrate for use in a lithium ion battery.

US 2010/0297502 discloses silicon nanowires grown on carbon particles for use in a lithium ion battery.

US 2008/0261112 discloses a network of entangled silicon nanowires connecting silicon particles for use in a lithium ion battery anode.

WO 2011/117436 discloses a carbon nanofibre including a plurality of crystalline whiskers extending from the surface of the carbon nanofibre.

SUMMARY OF THE INVENTION

In a first aspect the invention provides a powder comprising pillared particles for use as an active component of a metal ion battery, the pillared particles comprising a particle core and a plurality of pillars extending from the particle core, wherein the pillared particles are formed from a starting material powder wherein at least 10% of the total volume of the starting material powder is made up of starting material particles having a particle size of no more than 10 microns.

Optionally, the pillars are formed from a material that, in use, undergoes a volume expansion of at least 10% upon complete insertion into the material of the metal ions of the metal ion battery.

Optionally, the pillars comprise silicon.

Optionally, the core comprises silicon or carbon.

Optionally, the volume of the pillars is at least 20% of the total volume of the plurality of particles, optionally at least 40%.

Optionally, a BET value of the pillared particles is less than 200 m²/g, optionally less than 100 m²/g, optionally less than 60 m²/g, optionally less than 35 m²/g.

Optionally, an aspect ratio of the particle core is at least 2:1.

Optionally, an average pillar density of the pillars on the particle core is in the range 10-80%.

Optionally, the mean average pillar diameter is less than 80 nm.

Optionally, opposing surfaces of the particles carry pillars.

Optionally, an average length of the pillars is less than 5 microns, optionally less than 4 microns.

Optionally, only one of two opposing surfaces of the particles carries pillars.

Optionally, an average length of the pillars is less than 10 microns, optionally less than 8 microns.

Optionally, the particles are substantially discrete from one another.

Optionally, at least 50% of the total volume of the starting material powder is made up of starting material particles having a particle size of less than 15 microns.

Optionally, at least 90% of the total volume of the starting material powder is made up of starting material particles having a particle size of less than 25 microns.

Optionally, the particle sizes are as measured by a laser diffraction method in which the particles being measured are assumed to be spherical, and in which particle size is expressed as a spherical equivalent volume diameter.

The powder may consist essentially of the pillared particles, or it may be part of a composition comprising one or more further components.

Accordingly, in a second aspect the invention provides a composition comprising a powder according to the first aspect, and at least one further component.

Optionally according to the second aspect, the at least one further component comprises at least one further active component, optionally active carbon, optionally graphite.

Optionally according to the second aspect, the at least one further component comprises at least one conductive, non-active component, optionally conductive, non-active carbon.

Optionally according to the second aspect, the at least one further component comprises a binder.

Optionally according to the second aspect, the composition has a composite porosity, as a percentage of the total volume of the composite, that is at least the value given by the sum of the volume of pillars multiplied by 2 and the volume of particle cores multiplied by 1.2.

Optionally according to the second aspect, the at least one further component comprises a solvent.

In a third aspect the invention provides a metal ion battery comprising an anode, a cathode and an electrolyte between the anode and cathode wherein the anode comprises a powder according to the first aspect or a composition according to the second aspect.

Optionally according to the third aspect, the metal ion battery is a lithium ion battery.

In a fourth aspect the invention provides a method of forming a metal ion battery according to the third aspect comprising the step of forming the anode by depositing a composition according to the second aspect and evaporating the solvent.

In a fifth aspect the invention provides a method of forming a powder according to the first aspect comprising the step of etching particles of the starting material powder to form the pillared particles.

Optionally according to the fifth aspect, the mean average length of pillars is less than 5 microns.

In a sixth aspect the invention provides a method of forming a powder according to the first aspect comprising the step of growing pillars on particles of the starting material powder.

Optionally according to the sixth aspect, the pillars are grown on one surface only of the particles of the starting material powder.

In a seventh aspect the invention provides a powder comprising pillared particles for use as an active component of a metal ion battery, the pillared particles comprising a particle core and a plurality of pillars extending from the particle core, wherein at least 10% of the total volume of the powder is made up of particles having a particle size of no more than 10 microns.

The powder of the pillared particles of the seventh aspect may have any of the optional features described with reference to the powder comprising pillared particles of the first aspect, including without limitation the material of the pillars and particle core; the volume percentage of the pillars; the BET values of the powder, the aspect ratio of the particles; average pillar density; and size distribution of the pillared particles.

The powder of the pillared particles of the seventh aspect may form part of a composition of the powder and at least one further component. The one or more further components may be as described in the second aspect.

The powder of the seventh aspect, or a composition containing the powder, may be comprised in the anode of a metal ion battery, optionally a lithium ion battery, as described anywhere in the third aspect. This metal ion battery may be formed as described anywhere in the fourth aspect. The powder of the seventh aspect may be formed as described anywhere in the fifth or sixth aspects of the invention.

In an eighth aspect the invention provides a particle for use as an active component of a metal ion battery, the particle comprising a particle core and pillars extending from the particle core, wherein an aspect ratio of the particle core is at least 2:1.

The particle of the eighth aspect may comprise any of the optional features described in connection with the first aspect of the invention, either alone or in combination.

Particles of the eighth aspect the invention may form a powder of pillared particles formed from a starting material powder wherein at least 10% of the total volume of the starting material powder is made up of starting material particles having a particle size of no more than 10 microns. In this case, optionally at least 50% of the total volume of the starting material powder is made up of starting material particles having a particle size of less than 15 microns. Optionally at least 90% of the total volume of the starting material powder is made up of starting material particles having a particle size of less than 25 microns. Optionally, the particle sizes are as measured by a laser diffraction method in which the particles being measured are assumed to be spherical, and in which particle size is expressed as a spherical equivalent volume diameter. This powder may consist essentially of the pillared particles, or it may comprise one or more further components.

Particles of the eight aspect may form a powder as described anywhere in the seventh aspect.

Particles of the eighth aspect may form part of a composition comprising one or more further components as described with reference to the second aspect.

The anode of a metal ion, optionally a lithium ion battery, may comprise a powder or composition comprising particles of the eighth aspect. This anode of a metal ion battery may be formed by depositing said composition in a solvent, and evaporating the solvent.

The particle of the eighth aspect may be formed as described with reference to the fifth aspect or the sixth aspect.

In a ninth aspect the invention provides a particle for use as an active component of a metal ion battery, the particle comprising a particle core and pillars extending from the particle core, wherein at least one dimension of the particle is less than 10 microns.

The particle of the ninth aspect may comprise any of the optional features described in connection with the first aspect of the invention, either alone or in combination.

Particles of the ninth aspect the invention may form a powder of pillared particles formed from a starting material powder wherein at least 10% of the total volume of the starting material powder is made up of starting material particles having a particle size of no more than 10 microns. In this case, optionally at least 50% of the total volume of the starting material powder is made up of starting material particles having a particle size of less than 15 microns. Optionally at least 90% of the total volume of the starting material powder is made up of starting material particles having a particle size of less than 25 microns. Optionally, the particle sizes are as measured by a laser diffraction method in which the particles being measured are assumed to be spherical, and in which particle size is expressed as a spherical equivalent volume diameter. This powder may consist essentially of the pillared particles, or it may comprise one or more further components.

Particles of the ninth aspect may form a powder as described anywhere in the seventh aspect.

Particles of the ninth aspect may form part of a composition comprising one or more further components as described with reference to the second aspect.

The anode of a metal ion, optionally a lithium ion battery, may comprise a powder or composition comprising particles of the ninth aspect. This anode of a metal ion battery may be formed by depositing said composition in a solvent, and evaporating the solvent.

The particle of the ninth aspect may be formed as described with reference to the fifth aspect or the sixth aspect.

In a tenth aspect the invention provides a powder comprising particles having a particle core and pillars extending from the particle core for use as an active component of a metal ion battery wherein a BET value of the particle is less than 200 $m^2/g$, optionally less than 100 $m^2/g$, optionally less than 60 $m^2/g$, optionally less than 35 $m^2/g$.

The particle of the tenth aspect may comprise any of the optional features described in connection with the first aspect of the invention, either alone or in combination.

Particles of the tenth aspect the invention may form a powder of pillared particles formed from a starting material powder wherein at least 10% of the total volume of the starting material powder is made up of starting material particles having a particle size of no more than 10 microns. In this case, optionally at least 50% of the total volume of the starting material powder is made up of starting material particles having a particle size of less than 15 microns. Optionally at least 90% of the total volume of the starting material powder is made up of starting material particles having a particle size of less than 25 microns. Optionally, the particle sizes are as measured by a laser diffraction method in which the particles being measured are assumed to be spherical, and in which particle size is expressed as a spherical equivalent volume diameter. This powder may consist essentially of the pillared particles, or it may comprise one or more further components. Particles of the tenth aspect may form a powder as described anywhere in the seventh aspect.

Optionally according to the tenth aspect, a pillar mass fraction PMF of the pillared particles is in the range 10-60%, preferably 20-60%, wherein:

PMF=[(Total mass of pillars extending from the particle core)/(Total mass of pillared particle)]× 100.

Optionally according to the tenth aspect, a BET/PMF ratio is less than 3, optionally less than 2, optionally less than 1.5, optionally less than 1, wherein BET is in m2/g.

Optionally according to the tenth aspect, the BET/PMF ratio is less than 1.75.

Optionally according to the tenth aspect, the particle cores and pillars have substantially the same density, and PVF=PMF wherein:

PVF=[(Total volume of pillars extending from the particle core)/(Total volume of pillared particle)]×100.

Particles of the tenth aspect may form part of a composition comprising one or more further components as described with reference to the second aspect.

The anode of a metal ion, optionally a lithium ion battery, may comprise a powder or composition comprising particles of the tenth aspect. This anode of a metal ion battery may be formed by depositing said composition in a solvent, and evaporating the solvent.

The powder of the tenth aspect may be formed as described with reference to the fifth aspect or the sixth aspect.

In an eleventh aspect the invention provides a particle for use as an active component of a metal ion battery, the particle comprising a particle core and pillars extending from the particle core, wherein the volume of the pillars is at least 20% of the total volume of the particle, optionally at least 40%.

The particle of the eleventh aspect may comprise any of the optional features described in connection with the first aspect of the invention, either alone or in combination.

Particles of the eleventh aspect the invention may form a powder of pillared particles formed from a starting material powder wherein at least 10% of the total volume of the starting material powder is made up of starting material particles having a particle size of no more than 10 microns. In this case, optionally at least 50% of the total volume of the starting material powder is made up of starting material particles having a particle size of less than 15 microns. Optionally at least 90% of the total volume of the starting material powder is made up of starting material particles having a particle size of less than 25 microns. Optionally, the particle sizes are as measured by a laser diffraction method in which the particles being measured are assumed to be spherical, and in which particle size is expressed as a spherical equivalent volume diameter. This powder may consist essentially of the pillared particles, or it may comprise one or more further components.

Particles of the eleventh aspect may form a powder as described anywhere in the seventh aspect.

Particles of the eleventh aspect may form part of a composition comprising one or more further components as described with reference to the second aspect.

The anode of a metal ion, optionally a lithium ion battery, may comprise a powder or composition comprising particles of the eleventh aspect. This anode of a metal ion battery may be formed by depositing said composition in a solvent, and evaporating the solvent.

The particle of the eleventh aspect may be formed as described with reference to the fifth aspect or the sixth aspect.

In a twelfth aspect the invention provides a powder comprising pillared particles for use as an active component of a metal ion battery wherein:
the pillared particles comprise a particle core and a plurality of pillars extending from the particle core; and
a BET/PMF ratio of the pillared particle is less than 3, optionally less than 2, optionally less than 1.5, optionally less than 1, wherein:
BET is in m2/g, and PMF=[(Total mass of pillars extending from the particle core)/(Total mass of pillared particle)]× 100.

Optionally according to the twelfth aspect, a BET value of a powder of a plurality of the particles is less than 200 $m^2/g$, optionally less than 100 $m^2/g$, optionally less than 60 $m^2/g$, optionally less than 35 $m^2/g$.

Optionally according to the twelfth aspect, a pillar mass fraction PMF is in the range 10-60%, preferably 20-60%.

Optionally according to the twelfth aspect, the BET/PMF ratio is less than 1.75.

The powder of the twelfth aspect may comprise any of the optional features described in connection with the first aspect of the invention, either alone or in combination.

Particles of the twelfth aspect the invention may form a powder of pillared particles formed from a starting material powder wherein at least 10% of the total volume of the starting material powder is made up of starting material particles having a particle size of no more than 10 microns. In this case, optionally at least 50% of the total volume of the starting material powder is made up of starting material particles having a particle size of less than 15 microns. Optionally at least 90% of the total volume of the starting material powder is made up of starting material particles having a particle size of less than 25 microns. Optionally, the particle sizes are as measured by a laser diffraction method in which the particles being measured are assumed to be spherical, and in which particle size is expressed as a spherical equivalent volume diameter. This powder may consist essentially of the pillared particles, or it may comprise one or more further components.

Particles of the twelfth aspect may form a powder as described anywhere in the seventh aspect.

Particles of the twelfth aspect may form part of a composition comprising one or more further components as described with reference to the second aspect.

The anode of a metal ion, optionally a lithium ion battery, may comprise a powder or composition comprising particles of the twelfth aspect. This anode of a metal ion battery may be formed by depositing said composition in a solvent, and evaporating the solvent.

The particle of the twelfth aspect may be formed as described with reference to the fifth aspect or the sixth aspect.

In a thirteenth aspect the invention provides a composite electrode layer comprising electroactive pillared particles comprising a particle core and a plurality of pillars extending from the particle core wherein the composite electrode expands by less than 150%, preferably less than 125%, when charged for a first time to 3,000 mAh/g, the capacity being per gram of electroactive material in the composite electrode.

Optionally according to the thirteenth aspect, electrode thickness expansion upon charging for the first time to 2,000 mAh/g is less than 60%, more preferably less than 50%.

Optionally according to the thirteenth aspect, electrode thickness expansion upon charging for the first time to 1,500 mAh/g is less than 35%, more preferably less than 30%.

Optionally according to the thirteenth aspect, the electroactive pillared particles are silicon electroactive pillared particles.

Optionally according to the thirteenth aspect, the composite electrode further comprises one or more materials selected from binders, further electroactive materials and non-electroactive conductive materials.

Optionally according to the thirteenth aspect, the pillared particles are the only electroactive material in the composition.

The particles of the composite electrode of the thirteenth aspect may comprise any of the optional features described in connection with the first or second aspect of the invention, either alone or in combination.

Particles of the thirteenth aspect the invention may form a powder of pillared particles formed from a starting material powder wherein at least 10% of the total volume of the starting material powder is made up of starting material particles having a particle size of no more than 10 microns. In this case, optionally at least 50% of the total volume of the starting material powder is made up of starting material particles having a particle size of less than 15 microns. Optionally at least 90% of the total volume of the starting material powder is made up of starting material particles having a particle size of less than 25 microns. Optionally, the particle sizes are as measured by a laser diffraction method in which the particles being measured are assumed to be spherical, and in which particle size is expressed as a spherical equivalent volume diameter. This powder may consist essentially of the pillared particles, or it may comprise one or more further components.

Particles of the thirteenth aspect may form a powder as described anywhere in the seventh aspect.

Particles of the thirteenth aspect may form part of a composition comprising one or more further components as described with reference to the second aspect.

The anode of a metal ion, optionally a lithium ion battery, may comprise a powder or composition comprising particles of the thirteenth aspect. This anode of a metal ion battery may be formed by depositing said composition in a solvent, and evaporating the solvent.

The particle of the thirteenth aspect may be formed as described with reference to the fifth aspect or the sixth aspect.

In one embodiment according to any of the aforementioned aspects, the core may be an active graphite core. The core may be active graphene, for example a graphene core of a pillared particle as described in any one of the eighth, ninth, tenth, eleventh, twelfth or thirteenth aspects of the invention.

DESCRIPTION OF THE DRAWINGS

The invention will now be described in more detail with reference to the drawings wherein.

DETAILED DESCRIPTION OF THE INVENTION

Figure 1:
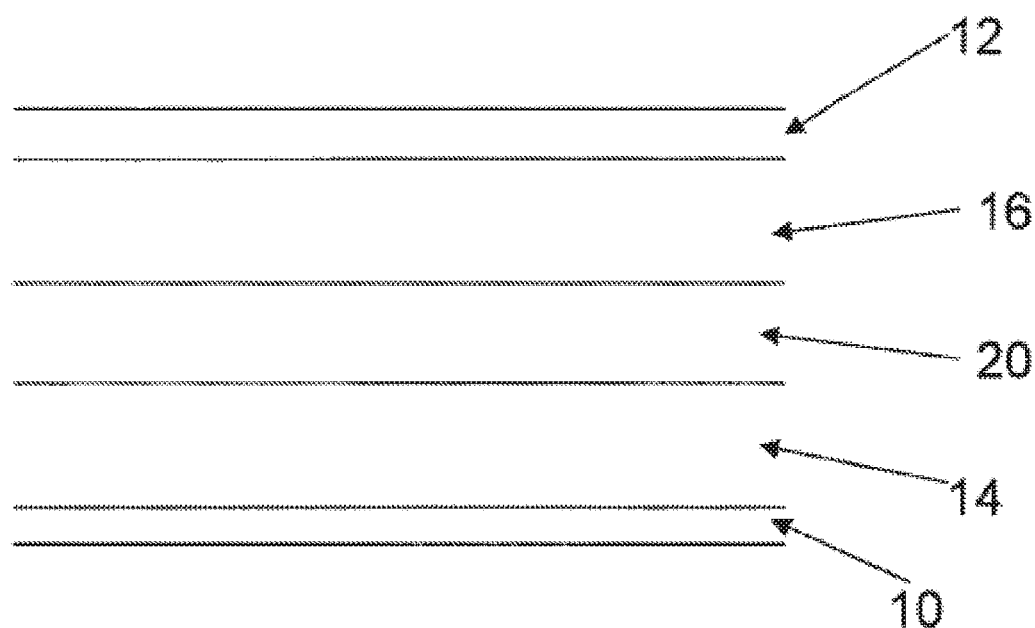
FIG. 1 is a schematic illustration of a lithium ion battery.

The invention is described herein with reference to lithium ion batteries and insertion and desorption of lithium ions, however it will be appreciated that the invention may be applicable to other metal ion batteries, for example sodium, potassium or magnesium ion batteries.

Pillared Particle Structure

"Pillared particles" as used herein mean particles comprising a particle core and a plurality of spaced-apart pillars extending therefrom. It is also to be understood that the pillar may be a wire, nanowire, rod, column, filament, thread, tube, cone or any other elongated structure extending from a particle core.

The pillared particles comprise an electroactive material such as graphite, graphene, hard carbon, silicon, germanium, gallium, tin, aluminium, lead, indium, antimony, bismuth, oxides, nitrides or hydrides thereof, mixtures of these, mixtures or composite alloys containing these elements and chalcogenides and ceramics that are electrochemically active. One exemplary active material is silicon which can insert and release lithium ions. The insertion of lithium ions into silicon or another electroactive material can be described as lithiation and the removal of the lithium can be described as delithiation. At least some of the plurality of pillars in a pillared particle comprise an electroactive material. The composition of the core and the pillars may be identical or different. Where the pillars and the core are of different compositions, both the pillars and the core may comprise an electroactive material. Alternatively only the pillars may comprise an electroactive material. Where only the pillars comprise an electroactive material and the core is formed from a non-electroactive material, the core preferably comprises an electronically conductive material.

The active material may be a material that undergoes expansion during insertion of metal ions. The expansion may be due to structural changes of the anode caused by formation of an alloy of the active material and the metal ions, for example a Si—Li alloy formed by insertion of lithium ions by silicon. Tin is another example of an active material that expands on metal ion insertion. The volume of an active material upon metallation, e.g. lithiation, to its maximum capacity may be at least 10% larger than its volume when substantially unmetallated. Exemplary materials that undergo an expansion of at least 10% include silicon and tin. The volume change of an active material upon metallation to its maximum capacity may be determined by computer modelling.

The core may be a single doped or undoped material, for example p-doped, n-doped or undoped silicon, or may comprise more than one material. For example, the core may comprise a first material at the core centre, which may or may not be electroactive, coated with an electroactive shell formed from a different second material. For example, the core may comprise a carbon centre coated with a silicon shell. The coating may provide a core surface that partially or fully covers the material at the core centre. In the case where the core material is carbon, exemplary cores include hard carbon, graphite and graphene.

The pillars may be the same material as or a different material to the material forming the core or core surface. In the case where the pillars and core are the same material, the pillars may be integral with the core surface. The plurality of pillars can be formed or fabricated on or attached to one or more surfaces of the particle core in a regular or irregular, ordered or disordered array or in a random scattered distribution.

Figure 2A:
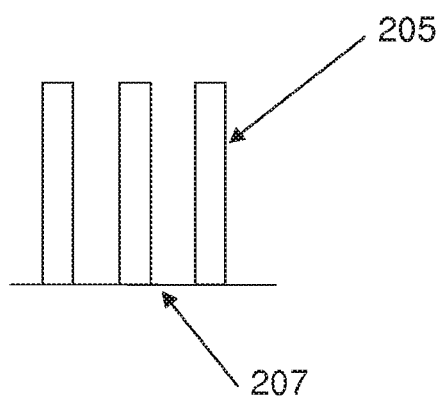
FIG. 2A illustrates schematically a pillar of a pillared particle according to an embodiment of the invention.
Figure 2B:
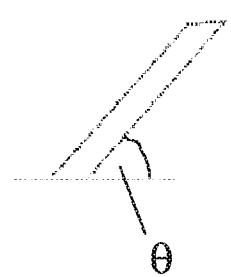
FIG. 2B illustrates schematically a pillar of a pillared particle according to an embodiment of the invention.

With reference to FIG. 2A, pillars 205 may be attached at one end to a surface of the core 207 and extend outwards substantially perpendicular to that surface, or may extend at an angle θ that is substantially less than 90 degrees as illustrated in FIG. 2B. Preferably the angle θ is 15-90 degrees, more preferably 40-90 degrees.

Figure 2C:
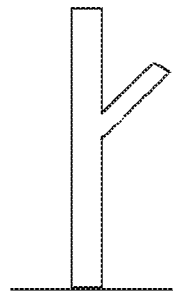
FIG. 2C illustrates schematically a pillar of a pillared particle according to an embodiment of the invention.

Each pillar may carry one or more branches branching from the pillar, as shown in FIG. 2C.

Figure 2D:
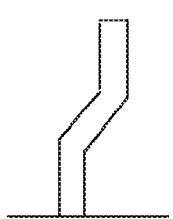
FIG. 2D illustrates schematically a pillar of a pillared particle according to an embodiment of the invention.

The pillars may include one or more kinks or changes in direction, as shown in FIG. 2D.

Figure 2E:
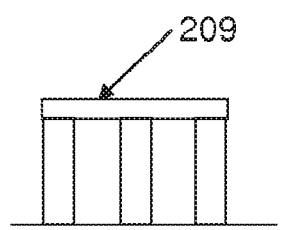
FIG. 2E illustrates schematically a pillar of a pillared particle according to an embodiment of the invention.

A plurality of pillars may carry a lintel 209, as shown in FIG. 2E. This lintel may be a porous structure that remains as an artefact of a starting material that has been etched to form a pillared particle, as described in more detail below. The pillars may be solid or porous or may comprise a solid core with a porous outer surface. The surface of the pillars may be smooth or rough.

The pillars may have cross sections that are substantially circular or may form other substantially regular or irregular shapes. Examples of regular shaped cross-sections include squares, rectangles, diamonds, or stars or variations of such shapes where the sides of the pillars have convex or concave surfaces rather than straight sides. Irregular cross-sectional shapes may for example include shapes formed from a combination of the aforementioned substantially regular cross-sectionals shapes.

The ends of the pillars may be spaced apart from the core surface.

The ends of one or more pillars may be joined together. This joining of ends may be an artefact of a method of forming a pillared particle wherein the pillars have been formed in a solution and/or the pillars are washed after manufacture and dried such that capillary action and surface tension causes adjacent pillars to be adhered to each other.

Figure 2F:
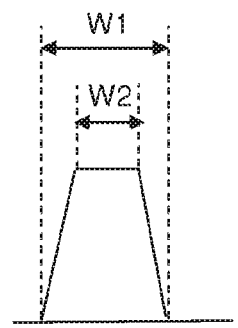
FIG. 2F illustrates schematically a pillar of a pillared particle according to an embodiment of the invention.

The width of the pillars may be substantially constant along at least part of the length of the pillars, or the width of the pillars may vary along their length. For example, the pillar may be a tapered structure having a width W1 at its base that is larger than a width W2 away from the base, as illustrated in FIG. 2F.

The pillars are spaced apart on the particle. In operation in the anode of a lithium ion battery (i.e. during charging and/or discharging of the battery), lithium ions are inserted into the electroactive pillars of the pillared particles during charging (also referred to as lithiation) and are released during discharge of the battery (also referred to as delithiation). During charging there is a significant expansion in the volume of the electroactive pillars due to the incorporation of lithium ions and during discharge there is a corresponding contraction of the pillar volume from delithiation. It has been observed that the volume expansion of the electroactive pillars during charge is substantially in the radial to lateral direction, for example it results in a pillar of increased diameter whilst the height is relatively unchanged or undergoes a relatively small change. Spacing apart of the pillars provides space into which the electroactive pillars may expand and contract without impeding each other, which reduces mechanical stress experienced by the pillars, that could otherwise lead to cracking, detachment and/or disintegration of the pillars from repeated insertion and desorption of lithium. The amount of radial expansion of the pillars into the spaces between them during charging may depend on the type of electroactive material contained in the pillars, the maximum amount of metal ions inserted into the pillars, the porosity of the pillars, their shape and other factors.

Preferably, the thickness of a composite electrode layer (excluding any substrate or current collector) containing pillared particles as described herein expands by less than 150%, preferably less than 125%, when charged for the first time (i.e. with no pre-lithiation) to 3,000 mAh/g, the capacity being per gram of silicon in the anode.

If other active materials are present in the composite electrode, for example active carbon, then capacity may be per gram of active material. Preferably, at least 5 weight %, at least 10 weight %, at least 20 weight % or at least 50 weight % of the active material is silicon active material (either in the form of a material consisting essentially of silicon or as a composite material having silicon at a surface thereof).

"Composite electrode" as used herein means a composition of at least one active material and one or more further materials. The one or more further materials may be selected from, without limitation, binders, further active materials such as active carbon, and non-active conductive materials, for example carbon black. The composite electrode does not include cell components that the composite electrode may be in contact with when in use, such as a current collector or electrolyte. The composite electrode is a solid composition. The constituents of the solid composite electrode may be dispersed in one or more solvents to form a slurry that may be deposited on a surface, in particular a current collector layer, followed by evaporation of the one or more solvents to form a composite electrode layer.

Optionally, pillared particles make up at least 5 weight %, at least 10 weight %, at least 20 weight %, at least 50 weight % or at least 60 weight % of a composite electrode.

Preferably electrode thickness expansion upon charging to 2,000 mAh/g is less than 60%, more preferably less than 50%.

Preferably electrode thickness expansion upon charging to 1,500 mAh/g is less than 35%, more preferably less than 30%.

The change in thickness of an electrode in an electrochemical cell may be measured as the cell is charged (first cycle) with an El-Cell® Electrochemical Dilatometer ECD-nano placed inside a temperature controlled chamber at 20° C.

Furthermore the plurality of spaced pillars increases the surface area of electroactive material in the pillared particle that can be contacted with the electrolyte in the battery. This increases the rate at which the lithium (or other metal ion) can be inserted into the electroactive material and aids the uniform insertion density of metal ions throughout the active material. Additionally, in a cell with liquid electrolyte, by providing enough spacing between pillars so that when they are fully expanded, space remains around them such that the electrolyte can remain in contact with the pillar and core surface without being squeezed out, then lithium loss during cycling can be reduced. For example, if there is not enough space between the pillars to accommodate the full expansion of the pillars during charge then the liquid electrolyte will be forced away from the particle surface and no longer be in contact with the surface of the pillars or core. In this case, during discharge it may be more difficult for all the lithium to be released and some could remain trapped in the pillars and/or particle core. Also, if the rate of release of the metal ions varies throughout the particle, peak mechanical stresses on contraction could increase, leading to fracture of the electroactive material.

Figure 2G:
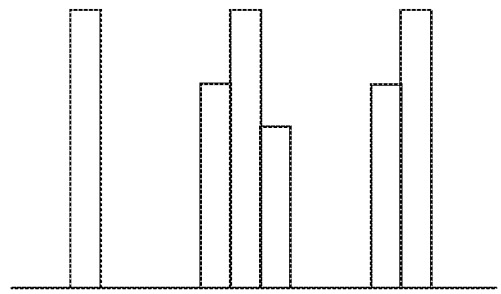
FIG. 2G illustrates schematically a pillar of a pillared particle according to an embodiment of the invention.

In one arrangement, substantially all of the pillars are spaced apart from one other. In another arrangement, the pillared particle may comprise at least some clusters of pillars as illustrated in FIG. 2G. The pillared particle may comprise both clusters of pillars and pillars that are spaced apart. The spacing between pillars and/or clusters of pillars may be regular or irregular. Preferably, the average distance between a pillar or pillar cluster and its adjacent pillars or pillar clusters is at least half the width of the pillar or pillar cluster. More preferably, the average distance between adjacent pillars or pillar clusters is at least the width of the pillar or pillar cluster. The width of a pillar is the pillar diameter in the case of a substantially cylindrical pillar.

In one preferred arrangement, at least some of the pillars of a pillared particle are substantially perpendicular to one or more surfaces of the particle core; are unbranched and are substantially straight.

An average pillar density of the pillars on the particle core may be in the range of about 0.1-80%, optionally 10-80%. These ranges may provide a balance between a maximum number of electroactive pillars available for lithium insertion and a reduced number of pillars to avoid cracking of the pillared particles and to provide space to avoid electrolyte being forced away from the particle surfaces.

Coverage can be defined by an average pillar density given by the formula A/(A+B)×100% where A is the area of a surface of the particle core occupied by pillars and B is the area of the same surface that is unoccupied by pillars. The average pillar density can be calculated for a single surface, several surfaces or for all surfaces of the particle core. Generally, it should be understood that unless otherwise stated, average pillar densities cited herein are calculated using the areas of surfaces occupied by pillars and individual surfaces of the particle core which do not contain any pillars are not included in the calculation.

To achieve an appropriate mass of electroactive pillars in a pillared particle, the average pillar density may be at least 0.1%, preferably at least 1%, more preferably at least 5% and most preferably at least 10%. For reasons given earlier it may be disadvantageous if the average pillar density is too high, preferably it is no more than 80%, more preferably it is no more than 60% and most preferably it is no more than 50%.

The pillars may have a length in the range 0.2 or 1 microns up to about 4 microns, optionally up to about 2 microns. The pillar length is preferably less than 10 microns.

The mean average thickness of the pillars may be at least 10 nm, optionally at least 20 nm and may be less than 1 µm. The mean average thickness may be a pillar diameter in the case of pillars with a substantially circular cross-section. In the case where the pillared particles include pillars with substantially non-circular or irregular cross-sectional forms, it will be appreciated that the mean average pillar thickness relates to the smallest dimension of the cross-sectional shape.

The mean average pillar thickness may be in the range of about 10-250 nm, optionally about 30-150 nm. The pillars may have a mean average pillar thickness of less than 80 nm. In the case where the pillared particles include pillars that are clustered together, it will be appreciated that the mean average pillar thickness relates to the thickness of the individual pillars, and not to thicknesses of pillar clusters Elongated structures or pillars with these diameters are ideally suited to withstand the expansion and contraction during charge and discharge without cracking, fracturing or disintegration. If the diameter becomes too small, for example less than 10 nm, then the high surface area to volume ratio of the pillars contributes to an excessively high lithium loss during operation of a cell from formation of a Surface Electrolyte Interphase (SEI) layer on the surface of the silicon and reduces the lifetime of a cell.

The pillared particles may have at least one first dimension (as measured along a single direction across the pillared particle including the core and pillars in the size measurement) of less than 10 µm. Another dimension of the pillared particle, which may be orthogonal to the first dimension, can be longer but is preferably no more than 50 µm and is preferably no more than 25 µm, most preferably no more than 20 µm.

The dimensions of the pillared particle, including length and thickness of pillars, may be measured by scanning electron microscopy or transmission electron microscopy. Mean average lengths and thicknesses may be obtained by measuring lengths and thicknesses for a plurality of pillars in a sample of a pillared particle material.

A composition or powder comprising a plurality of pillared particles is used in forming the anode of a lithium ion battery. The plurality of pillared particles may have a size distribution. Substantially all of the pillared particles in the composition may have at least one dimension of 10 µm or less. Alternatively, the composition may include pillared particles that do not have at least one dimension of 10 µm or less.

A distribution of the particle sizes of a powder of starting material particles used to form pillared particles may be measured by laser diffraction, in which the particles being measured are typically assumed to be spherical, and in which particle size is expressed as a spherical equivalent volume diameter, for example using the Mastersizer™ particle size analyzer available from Malvern Instruments Ltd. A spherical equivalent volume diameter is the diameter of a sphere with the same volume as that of the particle being measured. If all particles in the powder being measured have the same density then the spherical equivalent volume diameter is equal to the spherical equivalent mass diameter which is the diameter of a sphere that has the same mass as the mass of the particle being measured. For measurement the powder is typically dispersed in a medium with a refractive index that is different to the refractive index of the powder material. A suitable dispersant for powders of the present invention is water. For a powder with different size dimensions such a particle size analyser provides a spherical equivalent volume diameter distribution curve.

Size distribution of particles in a powder measured in this way may be expressed as a diameter value Dn in which at least n % of the volume of the powder is formed from particles have a measured spherical equivalent volume diameter equal to or less than D.

Preferred size distributions for a powder of starting material particles include one or more of the following:

D10≤10 µm
D50≤25 µm, optionally ≤15 µm, optionally ≤10 µm
D90≤25 µm, optionally ≤15 µm
D10≥0.5 µm, optionally ≥1 µm If a pillared particle is formed by etching a starting material particle, for example as described with reference to FIG. 3A below, or by growing pillars out of the starting material particle, then it will be appreciated that the particle core of the resultant pillared particle will be smaller than the starting material particle.

If the pillared particles are formed by growing or attaching pillars onto to the surface of a starting material particle, for example as described with reference to FIG. 3B, then it will be appreciated that the particle core of the resultant pillared particle will be substantially the same size as the starting material particle.

Therefore, if a starting material powder has a D10 value of ≤10 μm then it will be appreciated that the particle core of pillared particles in a product powder formed using this starting material powder must also have a D10 value of ≤10 μm, regardless of whether the pillared particles are formed by etching the particles of a starting material powder or by growth or attachment of pillars to the particles of a starting material powder.

As an alternative to using the size distribution of the starting material to determine a maximum possible size distribution of the product, Dn size distribution values of pillared particles may be measured directly. The Dn values of a pillared particle may relate to a diameter of a sphere having a surface that encompasses the core and the pillars in the case of a pillared particle with rigid pillars, for example pillars formed by etching silicon of a starting material, or may relate substantially to a diameter of a sphere having a surface that encompasses the core only in the case of a pillared particle with flexible pillars. Preferred size distributions for pillared particle products are as described above for starting materials.

An example measurement system for measuring the shapes and dimensions of particles in a powder of pillared particles or a powder of starting material particles using an optical microscope or SEM with digital image processing is Morphologi™, also available from Malvern Instruments Ltd. In this technique a 2D projection of the area of each particle is captured and the particle dimensions and shape can be measured and classified.

Pillared particles having at least one dimension of less than 10 μm may be more easily dispersed and incorporated into composite layers for high capacity anodes for reasons described herein. Additionally, if the particle core comprises an electroactive material which undergoes a large volume expansion and contraction during operation, a smaller core size may enable the particle core to insert and release more lithium (or other metal ion) without cracking or fracture of the core that may occur if larger pillared particles are used. A battery using these pillared particles as an active material may be charged to a higher capacity per unit mass or per unit volume than a battery comprising larger pillared particles, with little or no loss of stability.

Pillared particles having at least one dimension of less than 10 μm or a powder of pillared particles where the D10 value of the particle cores is less than 10 μm may also enable the formation of an anode layer that is thinner than an anode formed from pillared particles that do not have at least one dimension of less than 10 μm.

The inventors have found that it is easier to prepare thin composite anode coatings, for example a coating with an average thickness less than 60 μm, with a uniform thickness and homogeneously dispersed components using pillared particles of this size. Thin anode coatings (or layers) may be required to balance the cathode in a cell which typically has a much lower volumetric charge capacity than an anode comprising an electroactive material such as silicon. The thickness may be measured by observing cross sections of the anode coating produced using a microtome. The average thickness may also be calculated by measuring the mass of the anode coating per unit area if the densities and mass ratios of the components in the anode coating are known together with the coating porosity.

If pillars are formed by growth of nanowires on a starting material, as described in more detail below, then the nanowire core and pillars may have the dimensions described above, however nanowire pillars may have a mean length of no more than 10 times the mean average size of the core.

Surface area per unit mass of the pillared particle may be measured by various techniques including BET and laser diffractometry. The specific surface area measured using the BET (Brunauer, Emmett and Teller) technique may be less than 200 $m^2/g$. Preferably it is less than 100 $m^2/g$, more preferably it is less than 60 $m^2/g$ or less than 50 $m^2/g$, most preferably it is less than 35 $m^2/g$. The specific surface area measured using the BET technique may be more than 0.1 $m^2/g$, preferably it is more than 1 $m^2/g$ and more preferably it is more than 5 $m^2/g$. A higher specific surface area promotes the interaction of the metal ions with the active material, aiding a uniform insertion density of metal ions throughout the active material and enabling faster charge/discharge rates. However, if the specific surface area is too large then the charge capacity per unit mass and/or cycle life may be reduced through excessive formation of oxide and/or SEI layer on the surface of the active material. The specific surface area may be dependent on, for example, the size and density of the pillars, the porosity or surface roughness of the pillars and the size of the particle core.

Preferably the plurality of pillared particles in a powder used to form a composite are substantially discrete from one another. A "discrete pillared particle" as described herein means a pillared particle that is not joined or bound to another pillared particle. In a composite anode comprising a plurality of pillared particles, preferably during charging/discharging the relative movement from expansion and contraction of the electroactive material of each pillared particle is substantially independent of the movement from expansion and contraction of other nearby pillared particles. Preferably, the pillars of different pillared particles are not substantially intertwined or entangled. Pillared particles with pillars having preferred dimensions described above may avoid intertwining due to their short length, and due to the pillars being relatively inflexible as a result of their short length. Use of a composition containing pillared particles that remain substantially discrete from one another and/or experience relative movement during charging/discharging substantially independent of each other may reduce or eliminate the phenomenon of "lift" or "heave" resulting from expansion of an anode formed from a single block or interconnected mass of active material. Moreover, use of discrete particles in an anode may provide good contact between the pillared particles and the electrolyte. It may be more difficult for the electrolyte to wet the surfaces of active pillars in a tangled mass. It may also be more difficult to disperse the active particles uniformly within an electrode slurry or composite if the pillared particles are not substantially discrete or become entangled due to clumping of the entangled particles. It will be understood that the discrete pillared particles of a powder or composition may contain discrete pillared particles that may come into physical contact with each other and/or with other components, for example a binder or electrolyte, and that the discrete pillared particles may be contained within a matrix defined by a binder or other matrix material.

The pillared particles may be joined to each other after formation of a coating or composite, for example, sintering of a layer of pillared particles may be performed to provide a self supporting sintered composite.

Pillar Mass Fraction and Pillar Volume Fraction

The Pillar Mass Fraction (PMF) of a pillared particle is provided by the following equation:

PMF=[(Mass of pillars attached to and extending from the particle core)/(Total mass of pillared particle)]×100%

Accordingly, in the case of a silicon active pillared particle material it will be understood that the PMF is the mass of silicon pillars divided by the mass of the whole particle.

The PMF may be determined by various methods. If the pillars are grown on, deposited on or attached to the particle cores then the PMF may be calculated by measuring the mass of a plurality of particle cores before growth or attachment and the mass of the pillared particles after growth or attachment and subtracting one from the other to calculate the mass of pillars in the above equation.

If the pillared particle is made by etching a silicon particle to form silicon pillars on the surface of a particle core then the PMF may be determined by an oxidation technique. This involves firstly measuring the mass of a quantity of pillared particles and then measuring a change in mass over time of the quantity of pillared particles during oxidation, for example by heating pillared particles in an oxygen-containing atmosphere. e.g. by heating to 1040° C. in air. The pillars are fully oxidised first, and oxidise at a relatively rapid rate (shown as a relatively rapid increase in the rate of mass increase). Oxidation of the pillars is deemed to be complete when the rate of mass increase is observed to reduce and become linear with time. From this time onwards the rate of mass increase is due only by steady oxidation of the silicon into the particle core. The observed increase in mass up to this point is mostly due to oxidation of the pillars and using the difference in density between silicon and silicon oxide, the mass of the pillars before oxidation and hence the PMF can be determined. For a powder sample with a broad size distribution, the particles cores of the smaller pillared particles may additionally be oxidised and a correction factor may need to be applied to take account of the core oxidation. The correction factor can be estimated by doing the measurement on a sample comprising the particle cores with the pillars absent or removed. This method is particularly suitable for pillared particles having silicon pillars.

The PMF may also be determined by measuring the mass of a quantity of pillared particles, removing the pillars from the particle cores, for example by mechanical agitation (such as ultrasonication), scraping or chemical etching, separating the detached pillars from the particle cores and measuring either the mass of the quantity of particle cores and/or the mass of the detached pillars. This method is preferred because it may be applied to pillared particles of any material.

The PMF may be affected by, for example, the average length of pillars, their porosity and the percentage coverage of the particle core by the pillars (the pillar density). The PMF is preferably greater than or equal to 5%, more preferably at least 10%, most preferably at least 20%. The PMF is preferably no more than 95%, more preferably no more than 80%. Most preferably the PMF is 20-60%, especially 25-50%. A higher PMF value means that the high capacity active pillars make a larger contribution to the active mass of the electrode and a higher overall capacity per unit mass can be obtained. However, if the PMF value is too high then the cost of manufacturing the pillared particles may increase so that the cost to performance ratio of the electrode materials becomes uncompetitive, the pillars may become too densely packed and/or the mechanical/electronic integrity of the pillar to core connection may be weakened.

If the material of the particle core has a density significantly different from the density of the material forming the pillars, then the Pillar Volume Fraction (PVF) may be measured instead of PMF, although it will be appreciated that PVF is applicable to the cases in which the core and pillar densities are substantially the same (in which case the PVF value will be substantially the same as the PMF value) and the case in which the core and pillar densities are significantly different. The PVF is given by the following equation:

PVF=[(Total volume of pillars extending from the particle core)/(Total volume of pillared particle)]×100%

Similar methods to those used for measuring PMF may be used to measure PVF. Moreover, PVF may be derived from PMF measurements using a ratio of densities of the core material and the pillar material. The volumes of the pillars and the pillared particles are the volumes which do not include volumes of open pores. Closed pores or voids that are completely enclosed within the bulk of a core or pillar are included in the volumes. Accordingly, if the pillars or cores are porous, the porosity may need to be measured. Example techniques that may be used to measure porosity include mercury porosimetry and Barret-Joyner-Halenda (BJH) analysis.

Volumes of pillars and of pillared particles may be measured using a MasterSizer system or other similar laser diffractometry device, as described above. In an exemplary process, the volume of a pillared particle is measured; pillars are detached from the pillared particles by a mechanical process such as ultrasonication; and the volume of the pillars is measured. In the case of porous pillars or cores, the porosity is determined and the measured volume is adjusted. For example, if porosity is 5% then measured volume is adjusted by 0.95 to give a solid volume. The volumes may also be measured using 2D digital imaging systems such as Morphologi, as described above, though they typically are unable to resolve particles with a dimension below 0.5 µm.

The PVF may be affected by, for example, the average length of pillars and the percentage coverage of the particle core by the pillars (the pillar density) and the density of the particle core and pillar materials. The PVF is preferably greater than or equal to 5%, more preferably at least 10%, most preferably at least 20%. The PVF is preferably no more than 95%, more preferably no more than 80%. Most preferably the PVF is 20-60%, especially 25-50%. A higher PVF value means that the high capacity active pillars make a larger contribution to the active mass of the electrode and a higher overall capacity per unit volume can be obtained. However, if the PVF value is too high then the cost of manufacturing the pillared particles may increase so that the cost to performance ratio of the electrode materials becomes uncompetitive, the pillars may become too densely packed and/or the mechanical/electronic integrity of the pillar to core connection may be weakened.

Preferably the BET/PMF ratio of a powder of the pillared particles is preferably less than 3, less than 2, less than 1.5 or less than 1, wherein BET is the specific surface area of the pillared particles in $m^2/g$ and PMF is expressed a percentage as per the above equation.

Preferably, the BET/PMF ratio is greater than 0.1.

It will be understood that the BET/PMF ratio is an average value for pillared particles in a pillared particle powder.

Although an increase in PMF may increase BET, the relationship between PMF and BET is not linear (and it can for example be affected by the surface roughness or porosity of the pillars and core). The present inventors have found that the above BET/PMF ratio may exclude materials in which one of PMF and BET is too high or too low, leading to the disadvantages of a PMF or BET value that too low or that is too high, as described above.

Specific Charge Capacity of the Pillared Particles

The pillared particles preferably have a specific reversible charge capacity of at least 500 mAh per gram of pillared particle mass. The reversible charge capacity is the charge provided by discharge of the pillared particles in the anode of the cell after a full charge cycle. More preferably the pillared particles have a reversible charge capacity of at least 800 mAh/g, most preferably at least 1,000 mAh/g and especially at least 1,800 mAh/g. Preferably these reversible charge capacities are sustained for at least 50 charge/discharge cycles, more preferably at least 100 charge/discharge cycles, most preferably at least 200 charge/discharge cycles and especially at least 300 charge/discharge cycles.

Starting Materials for the Particle Core

The starting material for the particle core is preferably in particulate form, for example a powder, and the particles of the starting material may have any shape. For example, the starting material particles may be cuboid, cuboidal, substantially spherical or spheroid or flake-like in shape. The particle surfaces may be smooth, rough or angular and the particles may be multi-faceted or have a single continuously curved surface. The particles may be porous or non-porous.

A cuboid, multifaceted, flake-like, substantially spherical or spheroid starting material may be obtained by grinding a precursor material, for example doped or undoped silicon as described below, and then sieving or classifying the ground precursor material. Exemplary grinding methods include power grinding, jet milling or ball milling. Depending on the size, shape and form of the precursor material, different milling processes can produce particles of different size, shape and surface smoothness. Flake-like particles may also be made by breaking up/grinding flat sheets of the precursor material. The starting materials may alternatively be made by various deposition, thermal plasma or laser ablation techniques by depositing a film or particulate layer onto a substrate and by removing the film or particulate layer from the substrate and grinding it into smaller particles as necessary.

Samples or powders of the starting material particles may have D90, D50 and/or D10 values as described above.

In the case where a pillared particle is formed by etching a granular starting material having at least one dimension of less than 10 microns, it will be appreciated that at least one dimension of the pillared particles produced will likewise be no more than 10 microns. Depending on the degree and type of etching, one or more dimensions of the pillared particle may be less than the corresponding dimension of the starting material. In the case where a pillared particle is formed by etching, the starting material comprises an electroactive material as described above. Preferably it comprises an electroactive material that undergoes a volume expansion of at least 10% upon complete insertion by the material of the metal ion of a metal ion battery.

The starting material may comprise particles of substantially the same size. Alternatively, the starting material may have a distribution of particle sizes. In either case, sieves and/or classifiers may be used to remove some or all starting materials having maximum or minimum sizes outside desired size limits.

In the case where the pillared particle is formed by etching a material comprising silicon, the starting material may be undoped silicon or doped silicon of either the p- or n-type or a mixture, such as silicon doped with germanium, phosphorous, aluminium, silver, boron and/or zinc. It is preferred that the silicon has some doping since it improves the conductivity of the silicon during the etching process as compared to undoped silicon. The starting material is optionally p-doped silicon having $10^{19}$ to $10^{20}$ carriers/cc.

Silicon granules used to form the pillared particles may have a silicon-purity of 90.00% or over by mass, for example 95.0% to 99.99%, optionally 98% to 99.98%.

The starting material may be relatively high purity silicon wafers used in the semiconductor industry formed into granules. Alternatively, the granules may be relatively low purity metallurgical grade silicon, which is available commercially and which may have a silicon purity of at least 98%; metallurgical grade silicon is particularly suitable because of the relatively low cost and the relatively high density of defects (compared to silicon wafers used in the semiconductor industry). This leads to a low resistance and hence high conductivity, which is advantageous when the pillar particles or fibres are used as anode material in rechargeable cells. Impurities present in metallurgical grade silicon may include Iron, Aluminium, Nickel, Boron, Calcium, Copper, Titanium, and Vanadium, oxygen, carbon, manganese and phosphorus. Certain impurities such as Al, C, Cu, P and B can further improve the conductivity of the starting material by providing doping elements. Such silicon may be ground and graded as discussed above. An example of such silicon is "Silgrain™" from Elkem of Norway, which can be ground and sieved (if necessary) to produce silicon granules, that may be cuboidal and/or spheroidal.

The granules used for etching may be crystalline, for example mono- or poly-crystalline with a crystallite size equal to or greater than the required pillar height. The polycrystalline granules may comprise any number of crystals, for example two or more.

Where the pillared particles are made by a growth technique as described below, the starting material may comprise an electroactive material as described above. The starting material in this case may also comprise metal or carbon based particles. Carbon based starting materials may comprise soft carbon, hard carbon, natural and synthetic graphite, graphite oxide, fluorinated graphite, fluorine-intercalated graphite, graphene, carbon nanotubes (CNT), carbon fibres and multi-walled carbon nanotubes (MWCNT).

Graphene based starting materials may comprise particles comprising a plurality of graphene nanosheets (GNS) and/or oxidised graphene nanosheets (ox-GNS) or nano Graphene Platelets (NGP). Methods of making graphene particles include exfoliation techniques (physical, chemical or mechanical), unzipping of MWCNT or CNT, epitaxial growth by CVD and the reduction of sugars. Graphene based particles used as starting materials for the core of pillared particles preferably have an initial reversible charge capacity (on the first full charge cycle) of at least 400 mAh per gram of graphene particle, more preferably at least 500 mAh/g, most preferably at least 800 mAh/g and especially at least 1,000 mAh/g.

Methods of Pillared Particle Formation

Figure 3A:
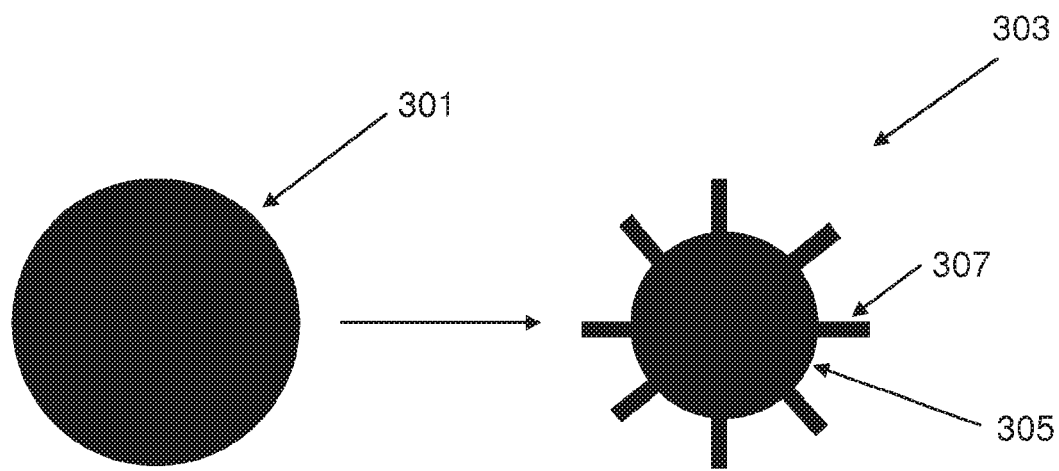
FIG. 3A illustrates schematically the formation of a pillared particle by an etching process according to an embodiment of the invention.
Figure 3B:
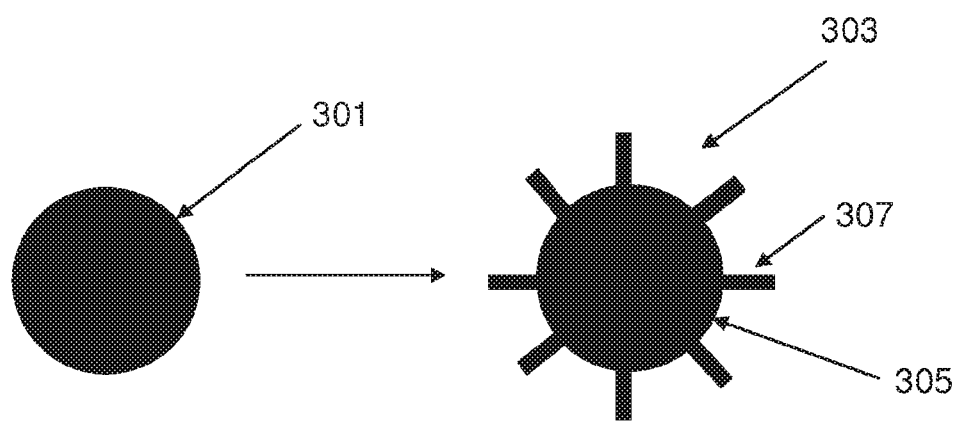
FIG. 3B illustrates schematically the formation of a pillared particle by a growth process according to an embodiment of the invention.

FIG. 3A illustrates a first method of forming pillared particles wherein a starting material is etched to form a pillared particle wherein a starting material 301 is exposed to an etching formulation for selective etching at the surface of the starting material to produce a pillared particle 303 having a core 305 and pillars 307.

It will be appreciated that the volume of the particle core of the pillared particle formed by this method is smaller than the volume of the starting material, and the surface of the core is integral with the pillars. The size of the pillared particle may be the same as or less than the size of the starting material.

A suitable process for etching a material having silicon at its surface is metal-assisted chemical etching (alternatively called galvanic exchange etching or galvanic etching) which comprises treatment of the starting material with hydrogen fluoride, a source of silver ions which electrolessly deposit onto the surface of the silicon and an oxidant, for example a source of nitrate ions. More detail on suitable etching processes can be found in, for example, Huang et al., Adv. Mater. 23, pp 285-308 (2011).

The etching process may comprise two steps, including a nucleation step in which silver nanoclusters are formed on the silicon surface of the starting material and an etching step. The presence of an ion that may be reduced is required for the etching step. Exemplary cations suitable for this purpose include nitrates of silver, iron (III), alkali metals and ammonium. The formation of pillars is thought to be as a result of etching selectively taking place in the areas underlying the silver nanoclusters. It is also known that metal-assisted etching of silicon can produce pillars with porous walls (for example as described in C. Chartier et al., Electrochimica Acta 2008, 53, p 5509), the level of porosity being dependent on dopant levels and the ratios of the components in the etching solution.

The nucleation and etching steps may take place in a single solution or may take place in two separate solutions.

Silver may be recovered from the reaction mixture for re-use.

Exemplary etching processes suitable for forming pillared particles are disclosed in WO 2009/010758 and in WO 2010/040985.

Other etching processes that may be employed include reactive ion etching, and other chemical or electrochemical etching techniques, optionally using lithography to define the pillar array.

If the pillared particle comprises a first material at its core centre with a shell formed from a second material, for example carbon coated with silicon as described above, then this particle may be formed by etching of silicon-coated carbon to a depth of less than the thickness of the silicon shell in order to form a pillared particle with a composite carbon/silicon core.

The pillars may also be formed on or attached to a particle core using methods such as growing, adhering or fusing pillars onto a core or growing pillars out of a core. FIG. 3B illustrates a second method of forming pillared particles wherein pillars 307, for example nanowires, are grown on or attached to a starting material 301 such as a silicon or carbon (e.g. graphite or graphene) starting material. The volume of the particle core 305 of the resultant pillared particle 303 may be substantially the same as the volume of the starting material 301. In other words, the surface of the starting material may provide the surface of the particle core 305 from which the pillars 307 extend.

Exemplary methods for growing pillars include chemical vapour deposition (CVD) and fluidised bed reactors utilising the vapour-liquid-solid (VLS) method. The VLS method comprises the steps of forming a liquid alloy droplet on the starting material surface where a wire is to be grown followed by introduction in vapour form of the substance to form a pillar, which diffuses into the liquid. Supersaturation and nucleation at the liquid/solid interface leads to axial crystal growth. The catalyst material used to form the liquid alloy droplet may for example include Au, Ni or Sn.

Nanowires may be grown on one or more surfaces of a starting material.

Pillars may also be produced on the surface of the starting material using thermal plasma or laser ablation techniques.

The pillars may also be formed by nanowire growth out of the starting material using methods such as a solid-liquid-solid growth technique. In one example silicon or silicon-based starting material granules are coated with catalyst particles (e.g. Ni) and heated so that a liquid alloy droplet forms on the surface whilst a vapour is introduced containing another element. The vapour induces condensation of a product containing the starting material and the other element from the vapour, producing growth of a nanowire out of the starting material. The process is stopped before all of the starting material is subsumed into nanowires to produce a pillared particle. In this method the core of the pillared particle will be smaller than the starting material.

Silicon pillars grown on or out of starting materials may be grown as undoped silicon or they may be doped by introducing a dopant during the nanowire growth or during a post-growth processing step.

Particle Core

Particle cores illustrated in FIGS. 3 and 4 are substantially spherical, however the particle core may have any shape, including substantially spherical, spheroidal (oblate and prolate), and irregular or regular multifaceted shapes (including substantially cube and cuboidal shapes). The particle core surfaces from which the pillars extend may be smooth, rough or angular and may be multi-faceted or have a single continuously curved surface. The particle core may be porous or non-porous. A cuboidal core may be in the form of a flake, having a thickness that is substantially smaller than its length or width such that the core has only two major surfaces.

The aspect ratio of a pillared particle core having dimensions of length L, width W and thickness T is a ratio of the length L to thickness T (L:T) or width W to thickness T (W:T) of the core, wherein the thickness T is taken to be the smallest of the 3 dimensions of the particle core. The aspect ratio is 1:1 in the case of a perfectly spherical core. Prolate or oblate spheroid, cuboidal or irregular shaped cores preferably have an aspect ratio of at least 1.2:1, more preferably at least 1.5:1 and most preferably at least 2:1. Flake like cores may have an aspect ratio of at least 3:1.

In the case of a substantially spherical core, pillars may be provided on one or both hemispheres of the core. In the case of a multifaceted core, pillars may be provided on one or more (including all) surfaces of the core. For example, in the case of a flake core the pillars may be provided on only one of the major surfaces of the flake or on both major surfaces.

The core material may be selected to be a relatively high conductivity material, for example a material with higher conductivity than the pillars, and at least one surface of the core material may remain uncovered with pillars. The at least one exposed surface of the conductive core material may provide higher conductivity of a composite anode layer comprising the pillared particles as compared to a particle in which all surfaces are covered with pillars.

Figure 5A:
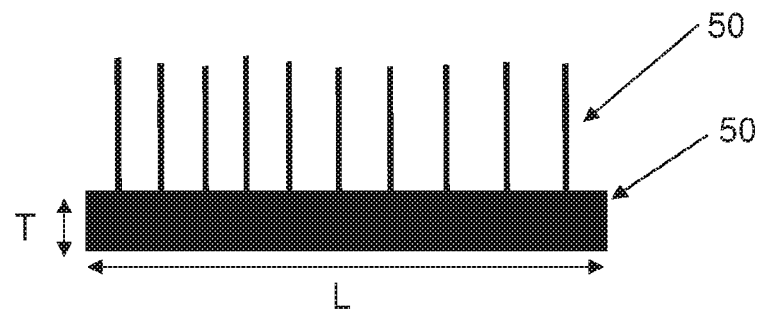
FIG. 5A illustrates schematically a pillared particle according to an embodiment of the invention.

FIG. 5A illustrates an embodiment in which the core 505 is formed from a relatively high conductivity material, for example a graphite particle, graphene sheet or a graphene particle comprising more than one graphene sheet, and silicon nanowires 507 are grown on one surface of the core. Alternatively the core can comprise a doped silicon material.

The aspect ratio, that is the ratio of length L to thickness T, is greater than 3:1 in this example.

Figure 5B:
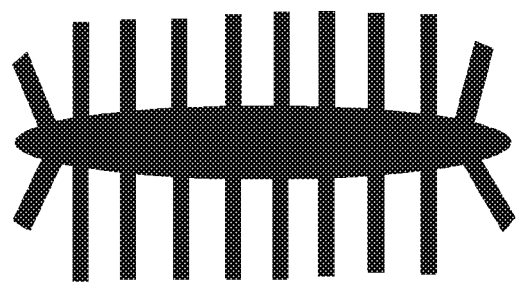
FIG. 5B illustrates schematically a pillared particle according to an embodiment of the invention.

FIG. 5B illustrates an embodiment in which pillars are provided on opposing surfaces of a core such as a graphene core or silicon flake.

Figure 5C:
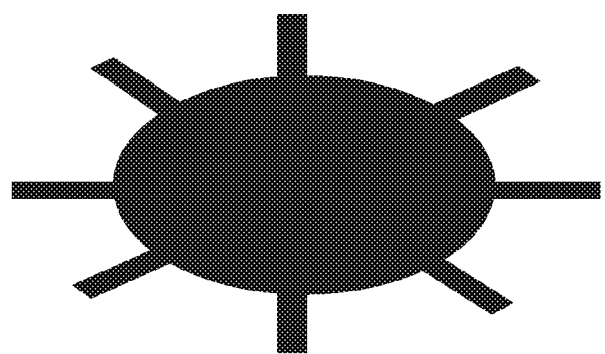
FIG. 5C illustrates schematically a pillared particle according to an embodiment of the invention.

FIG. 5C illustrates an embodiment in which the core is an oblate spheroid.

Figure 5D:
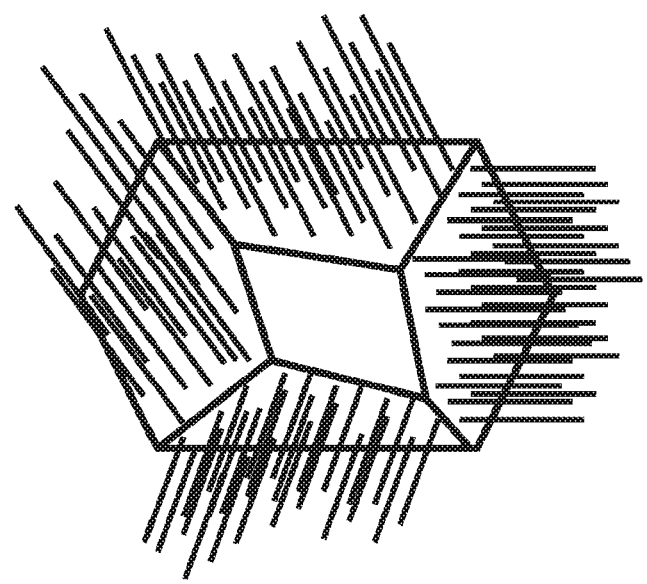
FIG. 5D illustrates schematically a pillared particle according to an embodiment of the invention.

FIG. 5D illustrates an embodiment in which the core is multifaceted and has an irregular shape. Pillars are provided on some facets only.

Figure 5E:
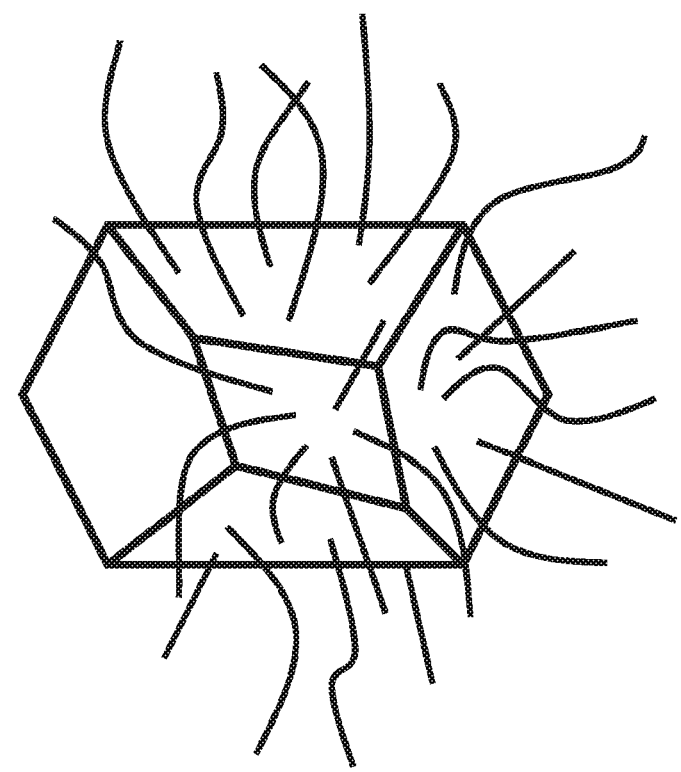
FIG. 5E illustrates schematically a pillared particle according to an embodiment of the invention.

FIG. 5E illustrates an embodiment in which the pillars are flexible. The flexibility of a pillar may depend on one or more of pillar length, pillar diameter, the pillar material and the way in which the pillar is made. In the embodiment of FIG. 5E the core is a multifaceted core having an irregular shape, although it will be appreciated that a core carrying flexible pillars may have any particle core shape as described herein.

A particle core with higher aspect ratio can increase the number of connections of the pillared particle with other elements in the composite electrode layer and/or the current collector and thereby improve the electrode conductivity. This connectivity may be further increased if one or more surfaces or part of one surface of the core have no pillars on them.

A particle core with a high aspect ratio can enable a higher PMF or PVF value to be obtained whilst providing a pillared particle with at least one dimension that is less than 10 microns.

If the pillared particle is made by etching a silicon starting material then a higher aspect ratio core can increase the manufacturing yield of the pillared particle in terms of the ratio of mass of the pillared particles produced relative to the mass of the starting material, compared to the yield with spheroidal starting materials. When an etching process is used, an increase in yield relates to a decrease in the PMF or PVF value but this potential reduction in the maximum lithiation capacity of the pillared particle can be offset if the particle core is made thin enough so that it can be lithiated to a higher degree without pulverisation.

Preferably the particle core has a smallest dimension of at least 0.2 µm, more preferably at least 0.5 µm.

If the particle core comprises an electroactive material, for example the core is silicon-comprising, then the core preferably has at least one dimension less than 6 µm, more preferably less than 5 µm, most preferably less than 4 µm and especially less than 3 µm.

A smaller core dimension enables higher lithiation of the active material in the core without risk of cracking the core, increasing the potential capacity of the pillared particle. It can also increase the attainable charge rate for high capacity anodes as the diffusion length for metal ions is reduced.

It is preferable that the pillared particles have a low resistivity—this will increase the conductivity of composites containing them and improve the cycling performance and charge rate of a metal ion battery. Some high capacity electroactive materials such as silicon have a relatively high resistivity compared to that of lower capacity electroactive materials such as graphite or non active metallic materials such as copper, however with good electrode design, pillared particles with medium range resistivity values can be used. Preferably the pillared particle has a resistivity of no more than 1000 $\Omega$cm, more preferably no more than 100 $\Omega$cm, most preferably no more than 10 $\Omega$cm, especially no more than 1 $\Omega$cm. The pillared particle may have a resistivity of at least $1\times10^{-5}$ $\Omega$cm, for example at least $1\times10^{-4}$ $\Omega$cm or at least $5\times10^{-4}$ $\Omega$cm.

The pillars preferably have a resistivity of no more than 100 $\Omega$cm, more preferably no more than 10 $\Omega$cm, especially no more than 1 $\Omega$cm. The pillars may have a resistivity of at least $1\times10^{-4}$ $\Omega$cm, for example at least $1\times10^{-3}$ $\Omega$cm or at least $1\times10^{-2}$ $\Omega$cm.

When the particle core comprises electroactive material, it preferably has a resistivity of no more than 100 $\Omega$cm, more preferably no more than 10 $\Omega$cm, especially no more than 1 $\Omega$cm. A particle core comprising electroactive material may have a resistivity of at least $1\times10^{-4}$ $\Omega$cm, for example at least $1\times10^{-3}$ $\Omega$cm or at least $1\times10^{-2}$ $\Omega$cm.

Figure 4A:
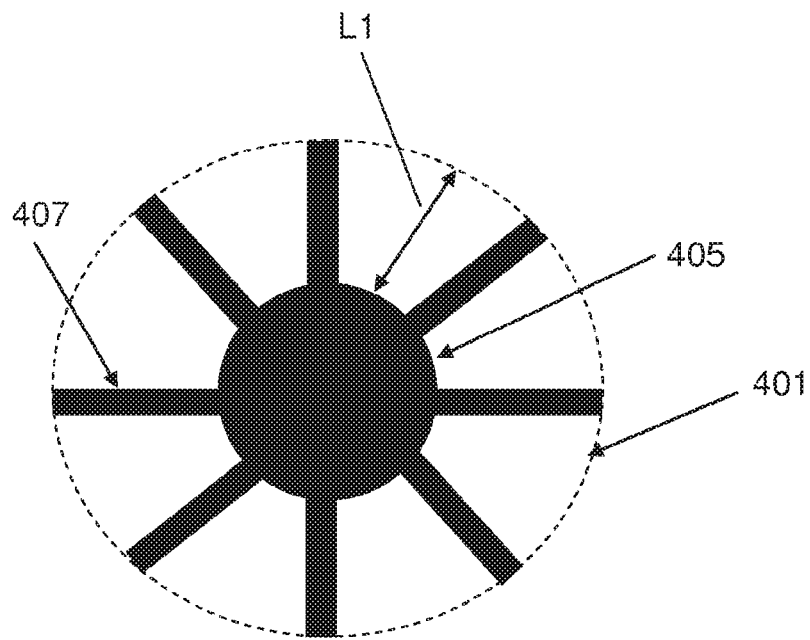
FIG. 4A illustrates schematically a pillared particle according to an embodiment of the invention formed by an etching process and having pillars of a first average length.
Figure 4B:
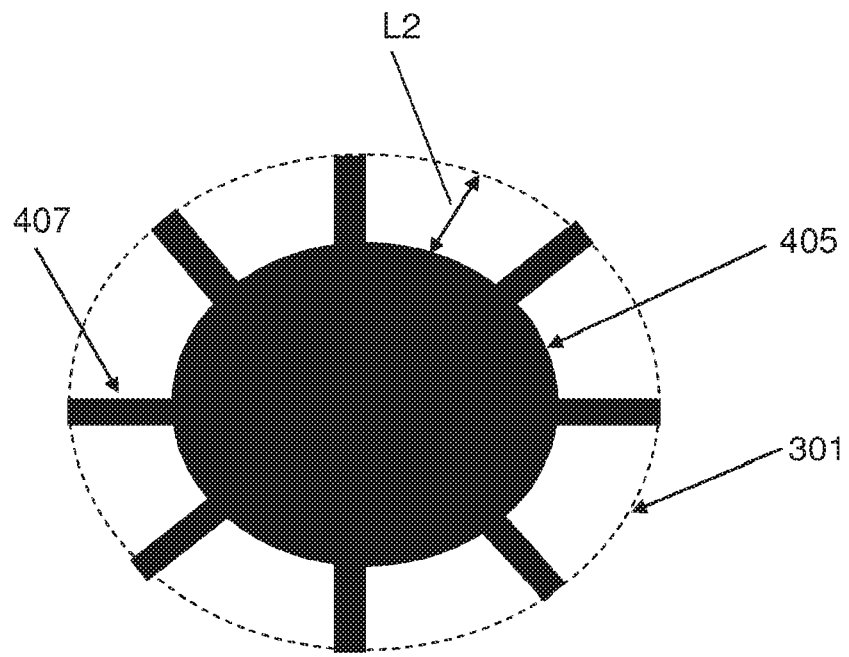
FIG. 4B illustrates schematically a pillared particle according to an embodiment of the invention formed by an etching process and having pillars of a first average length.

When the particle core does not comprise an electroactive material, it preferably has a resistivity of no more than 10 $\Omega$cm, more preferably no more than 1 $\Omega$cm, most preferably no more than 0.1 $\Omega$cm and especially no more than 0.01 $\Omega$cm. When the particle core is not electroactive it is particularly preferable that it has a resistivity of less than $5\times10^{-3}$ $\Omega$cm Pillar Length FIGS. 4A and 4B illustrate etching of a starting material to produce pillared particles. In this example, both the starting material 401 and the pillared particle core 405 are substantially spherical for ease of representation, however it will be understood that both the starting material and the pillared particle core may be of any shape.

In FIG. 4A, a starting material is etched to produce pillars 407 of length L1. In FIG. 4B, a starting material 401 is etched to produce shorter pillars 407 of length L2. The longer pillars of FIG. 4A result in a pillared particle with a higher PMF and may provide for higher capacity per unit mass of active material to insert lithium than the shorter pillars of FIG. 4B. The longer pillars of FIG. 4A also provide a pillared particle with a larger specific surface area promoting contact of the electrolyte with the surface of the active material. However, in an etching process the yield in terms of the ratio of mass of the pillared particles produced relative to the mass of the starting material will reduce as pillar length increases and may increase the cost of manufacturing electrode material. In addition, the higher specific surface area of the pillared particle in FIG. 4A may increase the amount of SEI layer formed in the electrode and may reduce the potential number of charge/discharge cycles that may be achieved.

Providing pillared particles in which all dimensions are less than 10 microns may limit the maximum length of the pillars, however it is easier to form a composite electrode layer with a uniform thickness and a uniform distribution of pillared particles within the composite and to achieve a suitable density of the composite.

Additionally, as the charge capacity of silicon material is much larger than graphite materials, when a cell comprises a composite anode layer where a significant proportion of the active material is pillared particles (for example where at least 20 wt % of the active material is pillared particles) then balancing the capacity of the anode to the cathode in the cell may mean that the anode layer must be made thin, for example less than 30 µm thick. In this respect, using pillared particles with at least one dimension less than 10 µm makes it easier to manufacture such thin layers with minimal variations in thickness.

Furthermore, if the particle core comprises electroactive material, the ability to stably lithiate and delithiate a higher volume fraction of the smaller core of a small pillared particle may at least partially offset any reduction in capacity from shorter pillars.

The average pillar length is preferably less than 5 microns, and may be in the range of 0.5-5 microns. However, if pillars are provided on only one of two opposing surfaces of a pillared particle then the average length may be longer, optionally less than 8 microns.

Applications

The pillared particles described herein may be used as an active component of an electrode, preferably an anode or negative electrode, of a metal ion battery, preferably a lithium ion battery, having a structure as described with reference to FIG. 1.

The pillars of the pillared particles may be detached to form a fibre that may likewise be used as a component of the anode of a lithium ion battery. The silicon fibres can be made by detaching the pillars from a pillared particle by one or more of scraping, agitating (especially by ultrasonic vibration) or chemical etching.

A powder consisting essentially of the pillared particles may be provided, for example by any of the aforementioned processes. This powder may be mixed with other materials to form a composition suitable for use in forming the anode of a metal ion battery.

Other materials of this composition may include, without limitation, one or more of:
a solvent or solvent mixture for forming a slurry containing the pillared particles (as will be understood by the skilled person, the solvent or solvent mixture does not dissolve the pillared particles, and the term "solvent" as used herein should be construed accordingly); other active materials; conductive, non-active materials, for example conductive, non-active carbon fibres; binders; viscosity adjusters; fillers; cross-linking accelerators; coupling agents and adhesive accelerators.

The pillared particles may be used as the only active component of an anode, or may be used in combination with one or more other active components. In one embodiment, the pillars of the pillared particles, and optionally the core, are silicon, and the pillared particles are mixed with an active component formed from another material, for example graphite.

An active graphite electrode may provide for a larger number of charge/discharge cycles without significant loss of capacity than an active silicon electrode, whereas a silicon electrode may provide for a higher capacity than a graphite electrode. Accordingly, a composition of a silicon-containing active material and a graphite active material may provide a lithium ion battery with the advantages of both high capacity and a large number of charge/discharge cycles. The use of pillared particles having at least one dimension less than 10 microns as described herein may be particularly advantageous in view of the greater capacity per volume or capacity per mass of such pillared particles as compared to larger pillared particles.

A composition of graphite and a pillared particle comprising silicon may contain at least 5 weight % silicon, optionally at least 10 weight % silicon.

In order to form the anode of a battery a slurry containing the pillared particles in a solvent or solvent mixture may be deposited on an anode current collector formed from a conductive material, for example copper, followed by evaporation of the solvent(s). The slurry may contain a binder material and any other active materials to be used in the anode. Exemplary binders include polymer binders such as polyacrylic acid (PAA), polyimide (PI), polyvinylalcohol (PVA) and polyvinylidene fluoride (PVDF), carboxymethylcellulose (CMC), (styrene-butadiene rubber (SBR) and metal ion salts thereof. A binder may also be a mixture of one or more polymers. Other materials that may be provided in the slurry include, without limitation, a viscosity adjuster, a filler, a cross-linking accelerator, a coupling agent and an adhesive accelerator. The component materials of the composite are suitably mixed together to form a homogeneous electrode composition that can be applied as a coating to a substrate or current collector to form a composite electrode layer adhered to said substrate of current collector.

The composite electrode containing pillared particles may be porous to enable wetting of the active material by the electrolyte and to provide space to accommodate the expansion of active material during charge and prevent swelling of the electrode. The composite porosity may be defined as the total volume of pores, voids and empty spaces in the composite electrode in the uncharged state before any electrolyte is added to or contacted with the composite electrode, as a percentage of the total volume occupied by the composite material layer. It may be measured by, for example, mercury or nitrogen porosimetry.

However if the porosity is too high the mechanical integrity of the electrode may be affected and the charge capacity per unit volume (or mass) may be reduced A suitable level of porosity may depend on several factors including but not limited to composition, particle size, type of electrolyte/binder, layer thickness, cell type/design. At least some of the porosity will be provided by the void space between the pillars of the pillared particles. Preferably the porosity of the composite in the uncharged state is at least 10%, more preferably at least 20% and especially 30%. Preferably the porosity of the composite in the uncharged state is no more than 80%, more preferably no more than 60%.

Preferably the porosity of the composite material is at least twice the ratio of the volume of the pillars of the pillared particles contained in the composite as a percentage of the total volume occupied by the composite material layer. This applies in particular where the surface of the core is not an active material, or the core expands by no more than 10% upon full lithiation, in which case the minimum pore volume is preferably 2× the volume of the pillars. Preferably in this case, the maximum pore volume is 4× the volume of the pillars+1.1× core volume.

If the composite material contains pillared particles with particle cores comprising electroactive material, preferably an electroactive material that expands by more than 10% on full lithiation, the porosity may be higher to further accommodate the expansion of the particle cores when they are lithiated. In this case a suitable minimum composite porosity may be given by the sum of the volume of pillars multiplied by two and the volume of particle cores multiplied by 1.2, as a percentage of the total volume of the composite material layer.

Preferably, maximum pore volume provided by the pillared particles=4×(pillar volume+core volume)=4×volume of pillared particles.

The appropriate minimum or maximum composite porosity is calculated from the aforementioned pore volumes by dividing the pore volumes by the total volume of the composite layer×100%.

Porosity is of the composite as a whole, which may include, without limitation, porosity provided by space between pillars, and space between particles of the composite electrode.

Porosity used in a battery is a balance between high porosity to enable good surface contact between the electrolyte of the electroactive materials and to provide a buffer space to minimise overall expansion of the electrode during charging and a porosity that is low enough to provide good cohesion of the composite electrode and good adhesion to the anode current collector, together with an appropriate density of electroactive material per unit volume of electrode which affects the overall volumetric capacity/rating of the battery. Pillared particles as described herein provide an effective way of introducing porosity into a composite electrode, with an optimal level of porosity which is particularly beneficial for silicon-containing anodes due to the high specific capacity of silicon and associated high degree of expansion of silicon upon charging.

The anode composite material layer may be any suitable thickness. The pillared particles of this invention are especially advantageous for making composite layers with an average thickness of less than 60 μm or even less than 30 μm (not including the thickness of the current collector). Preferably the composite layer thickness is at least 10 μm thick, more preferably at least 12 μm thick. The anode may comprise a composite layer deposited/attached on one or both sides of the current collector.

Examples of suitable cathode materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$, $LiFePO_4$, $LiVPO_4F$, $LiMn_2O_4$, $LiNi_{0.8}Co_{0.15}Al_{0.05}O_2$, $LiNi_{0.5}Co_{0.2}Mn_{0.03}O_2$, $xLi_2MnO_3$ $(1-x)LiMO_2$, $Li_2FeS_2$, vanadium oxides and sulphur based compounds. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a lithium salt and may include, without limitation, non-aqueous electrolytic solutions, solid electrolytes and inorganic solid electrolytes. Examples of non-aqueous electrolyte solutions that can be used include non-protic organic solvents such as N-methylpyrrolidone, propylene carbonate, ethylene carbonate, fluoroethylene carbonate, di fluoroethylene carbonate, vinyl carbonate, vinylene carbonate, vinylethylene carbonate, butylene carbonate, dimethyl carbonate, diethyl carbonate, gamma butyro lactone, 1,2-dimethoxy ethane, 2-methyl tetrahydrofuran, dimethylsulphoxide, 1,3-dioxolane, formamide, dimethylformamide, acetonitrile, nitromethane, methylformate, methyl acetate, phosphoric acid trimester, trimethoxy methane, sulpholane, methyl sulpholane and 1,3-dimethyl-2-imidazolidione.

Examples of organic solid electrolytes include polyethylene derivatives polyethyleneoxide derivatives, polypropylene oxide derivatives, phosphoric acid ester polymers, polyester sulphide, polyvinyl alcohols, polyvinylidine fluoride and polymers containing ionic dissociation groups.

Examples of inorganic solid electrolytes include nitrides, halides and sulphides of lithium salts such as $Li_5NI_2$, $Li_3N$, LiI, $LiSiO_4$, $Li_2SiS_3$, $Li_4SiO_4$, LiOH and $Li_3PO_4$.

The lithium salt (or mixture of salts) is suitably soluble in the chosen solvent or mixture of solvents. Examples of suitable lithium salts include LiCl, LiBr, LiI, $LiClO_4$, $LiBF_4$, $LiB_{10}C_{20}$, $LiPF_6$, $LiCF_3SO_3$, $LiAsF_6$, $LiSbF_6$, $LiAlCl_4$, $CH_3SO_3Li$, Lithium bis(oxalto)borate (LiBOB) and $CF_3SO_3Li$.

Where the electrolyte is a non-aqueous organic solution, the battery is provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

In addition to lithium ion batteries, pillared particles as described herein may be used in solar cells (including solar capacitors), capacitors, filters, fuel cells, detectors and sensors.

EXAMPLES

Pillared Particle Formation

Three powder samples of pillared particles, designated A, B and C, were prepared by etching silicon granule starting materials with the D10, D50 and D90 size distribution values listed in Table 1. The particle sizes were measured using a MasterSizer™ 2000 version 5.60 with a water dispersant. Etching to produce silicon pillared particles was performed as described in WO 20101040985. Table 1 lists the BET, PMF and average pillar lengths for each pillared particle sample. Average pillar diameters for all three samples were in the range of 50-150 nm. A mean average pillar length may be determined from SEM measurements of a plurality of pillar lengths. Typical pillar densities were 25-40%.

TABLE 1

|  | Powder A | Powder B | Powder C |
| --- | --- | --- | --- |
| Si purity | 99.8 wt % | 99.8 wt % | 99.95 wt % |
| BET of starting material (m2/g) | 0.34 | 0.67 | 0.98 |
| Mastersizer D10 (starting material) | 14.7 μm | 8.2 μm | 6.0 μm |
| Mastersizer D50 (starting material) | 23.7 μm | 13.5 μm | 9.9 μm |
| Mastersizer D90 (starting material) | 37.6 μm | 21.9 μm | 15.9 μm |
| BET of pillared particles (m2/g) | 45 | 32.9 | 4.5 |
| Average PMF (=PVF) | 30-35% | 34% | 24% |
| Average pillar lengths (μm) | 2-3 μm | 1.8-2 μm | 1.6-1.8 μm |
| No. of cycles at 1200 mAh/g before fading to 90% | 250 | 330 | >390 |

Figure 6:
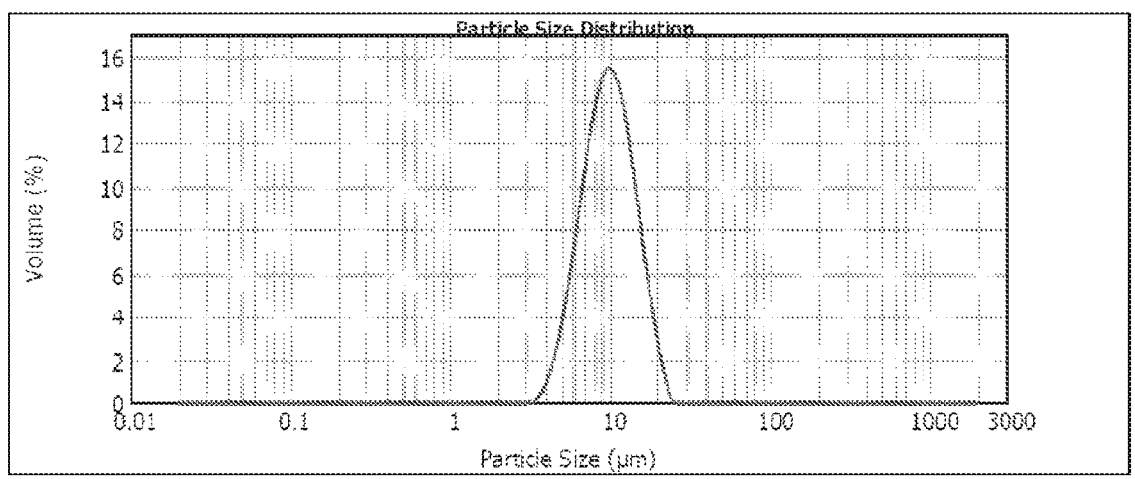
FIG. 6 is a graph of size distribution of a starting material powder according to an embodiment of the invention.

FIG. 6 illustrates a size distribution of the spherical equivalent volume diameters of the starting material particles for Powder C. The D50 value is 9.9 microns showing that 50% of the volume (and 50% of the mass) of the starting material particles have a spherical equivalent volume diameter of less than or equal to 9.9 microns.

Figure 7:
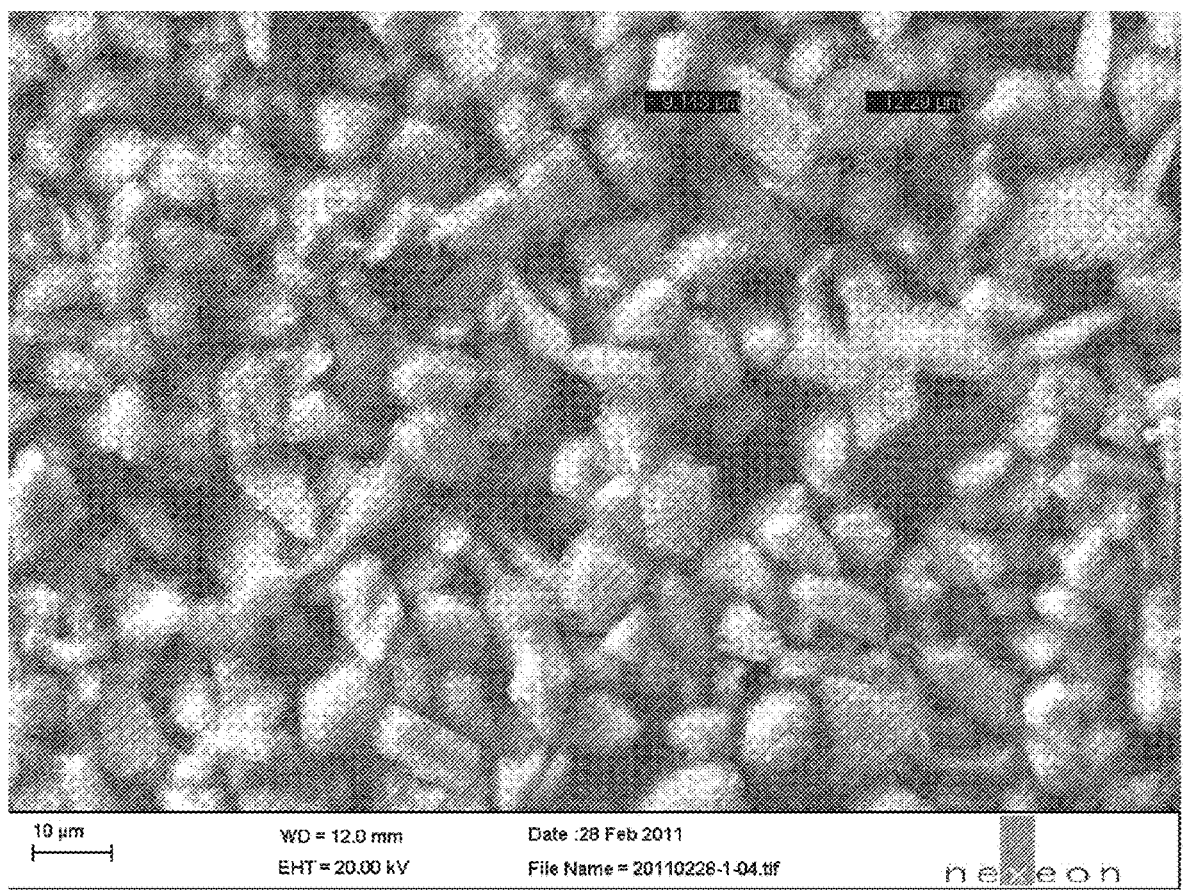
FIG. 7 is a first SEM image of a powder according to an embodiment of the invention.

FIG. 7 is a SEM photograph of pillared particles of Powder C (Example 2). It can be seen that the powder includes particles having at least one dimension that is less than 10 microns, as well as particles having a dimension of 10 microns or more, although the size distribution of the particles is such that at least 50% of the particles have a dimension of less than 10 microns.

Figure 8:
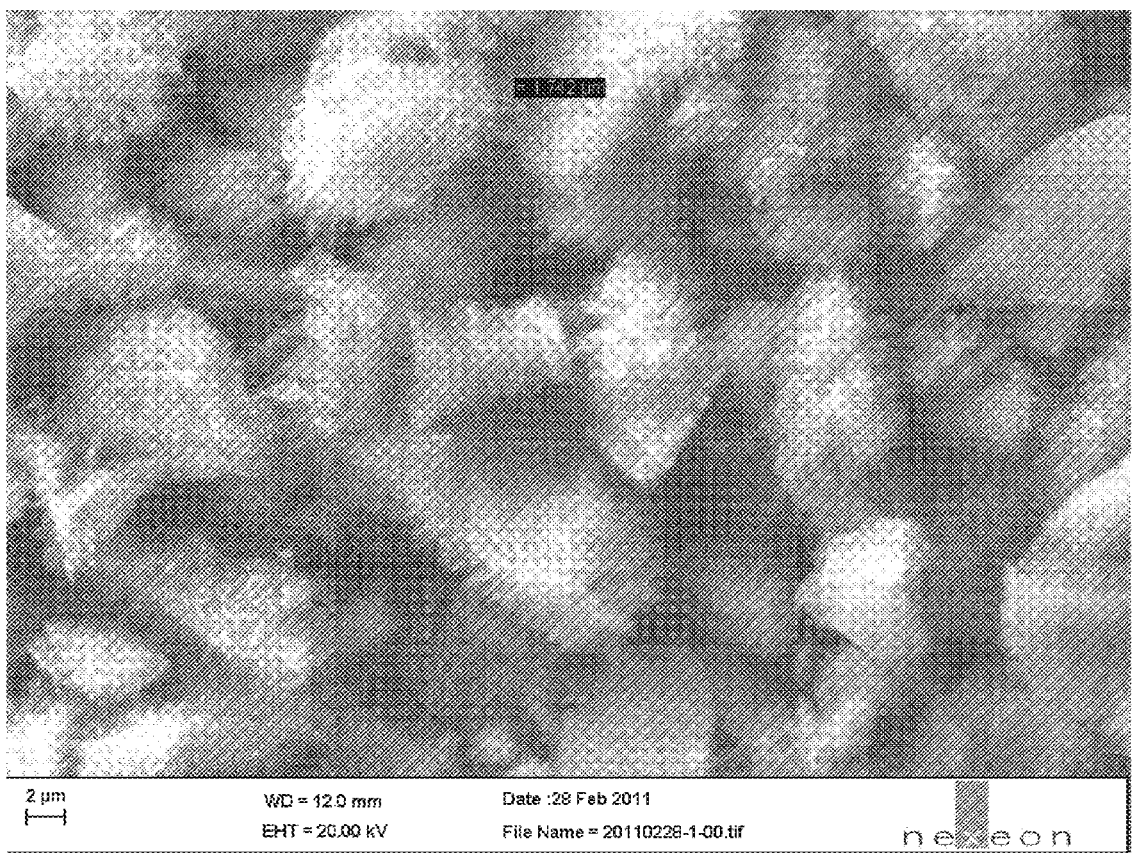
FIG. 8 is a second SEM photograph of the powder of FIG. 7.

FIG. 8 is a further SEM photograph of the pillared particles or Powder C (Example 2). The pillared particles include pillars having a length of about 2 microns.

The Dn size distribution of the starting material and the product may be substantially the same. Metallurgical grade silicon starting powder available from Elkem (Silgrain HQ), was etched using metal assisted etching as described above under "Pillared Particle Formation". The starting material had D10, D50 and D90 values of 2.8, 4.6 and 7.9 microns respectively. The product, referred to as Powder Product D, had D10, D50 and D90 values of 2.8, 4.6 and 7.6 microns respectively both measured using a Malvern Mastersizer, indicating that the volume distribution of particles with effective spherical diameters of a sphere encompassing the core and pillars of the pillared particles may remain substantially the same as the volume distribution of effective spherical diameters of a sphere encompassing the starting material.

Figure 9:
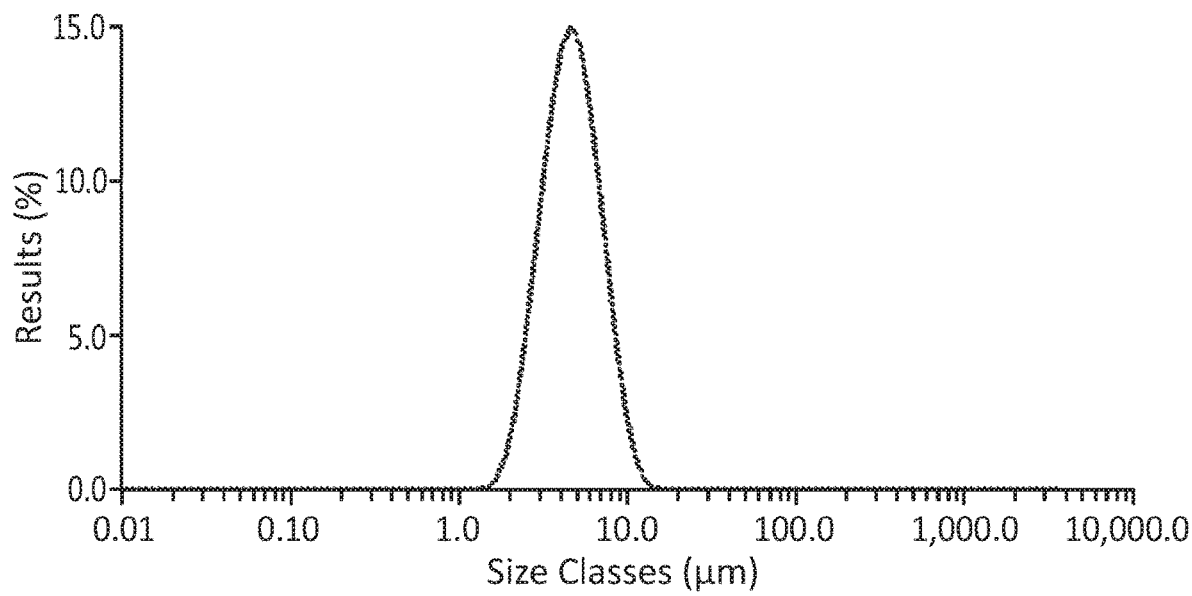
FIG. 9 is a graph of size distribution of a pillared particle powder according to an embodiment of the invention.

The volume distribution of the pillared particle product is illustrated in FIG. 9.

Electrode and Cell Fabrication

Anode Preparation

The desired amount of pillared particle composition was added to a conductive carbon mixture that had been bead milled in deionised water. The resulting mixture was then processed using an IKA overhead stirrer at 1200 rpm for around 3 hours. To this mixture, the desired amount of binder in solvent or water was added. The overall mix was finally processed using a Thinky™ mixer for around 15 minutes. Viscosity of the mix was typically 500-3000 mPas at 20 rpm.

Product Powder A comprised pillared particles produced from a starting material of silicon particles with average dimensions of 15-25 μm and a D10 value of 14.7 μm. Pillared particles produced from this starting material had a pillar volume fraction of 30-35%, a BET value of 45 $m^2/g$, pillars of average length 2-3 μm and diameters of 50-150 nm. Composite anode D was made with 70% by mass of these pillared particles, 15% Na-PAA binder and 15% conductive carbon by mass.

Product Powder B (Example 1) comprised pillared particles produced from a starting material of silicon particles including particles with at least one dimension less than 10 μm and a D10 value of 8.2 μm. Pillared particles produced from this starting material had a pillar volume fraction of 34%, a BET value of 32.9 $m^2/g$, pillars of average length 1.8-2 μm and diameters of 50-150 nm. Composite anode E was made with 70% by mass of these pillared particles, 15% Na-PAA binder and 15% conductive carbon by mass.

Product Powder C (Example 2) comprised pillared particles produced from a starting material of silicon particles including particles with at least one dimension less than 10 μm and a D10 value of 6 μm. Pillared particles produced from this starting material had a pillar volume fraction of 24%, a BET value of 4.5 $m^2/g$, pillars of average length 1.6-1.8 μm and diameters of 50-150 nm. Composite anode F was made with 70% by mass of these pillared particles, 15% Na-PAA binder and 15% conductive carbon by mass.

The composite anode mixture was applied to a 10 μm thick copper foil (current collector) using a doctor-blade technique to give a 20-35 μm thick coating layer (coat weight of 14-15 gsm). The resulting electrode was then allowed to dry.

Cathode Preparation

The cathode material used in the test cells was a commercially available lithium mixed metal oxide (MMO) electrode material (e.g. $Li_{1+x}Ni_{0.8}Co_{0.15}Al_{0.05}O_2$) on a stainless steel current collector.

Electrolyte

The electrolyte used in all cells was lithium hexafluorophosphate, dissolved in a mixture of ethylene carbonate and ethyl methyl carbonate (in the ratio 3:7 by volume) and containing 15 wt % fluorethylene carbonate (FEC), and 3 wt % vinylene carbonate (VC) additives. The electrolyte was also saturated with dissolved $CO_2$ gas before being placed in the cell.

Cell Construction and Testing

Test cells were made using composite anodes D, E and F as follows:

Anode and cathode discs of 12 mm diameter were prepared and dried over night under vacuum.

The anode disc was placed in a 2-electrode cell fabricated from Swagelok® fittings.

Two pieces of Tonen® separator of diameter 12.8 mm and 16 um thick were placed over the anode disc.

40 μl of electrolyte was added to the cell.

The cathode disc was placed over the wetted separator to complete the cell.

A plunger of 12 mm diameter containing a spring was then placed over the cathode and finally the cell was hermetically sealed. The spring pressure maintained an intimate interface between the electrodes and the electrolyte.

The electrolyte was allowed to soak into the electrodes for 30 minutes.

Once assembled, each cell was connected to an Arbin™ battery cycling rig, and tested on continuous CC charge and discharge cycles as follows. For the initial cycle, the cell was charged to a maximum capacity of 2000 mAh per gram of silicon or until the voltage decreases to 0.005 V, whichever occurs first. After five minutes rest, the cell was then discharged to a voltage of 1.0 V vs lithium. The cell is then rested for 30 minutes. The cell is subsequently charged/discharged at a C/5 rate by charging the cell to either 1200 mAh per gram of silicon (or approx. 1300 mAh/g for the cell with composite anode E) or 0.005 V, whichever occurs first, resting for 5 minutes and then a constant current discharge to 1.0 V vs lithium and resting for 30 minutes before commencing the next charge.

Figure 10:
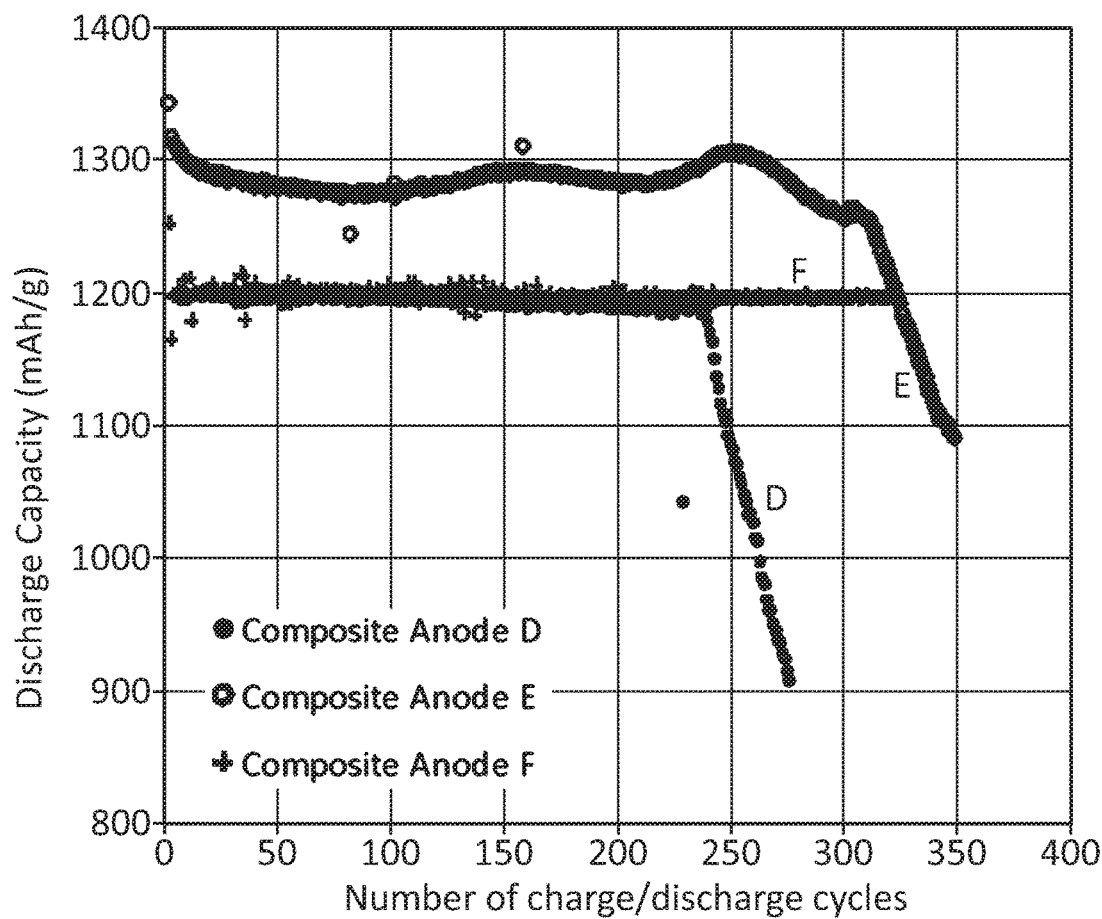
FIG. 10 is a plot of discharge capacity vs number of discharge cycles for two lithium ion cells containing relatively small particles and a lithium ion cell containing relatively large particles.

FIG. 10 plots the specific discharge capacity vs number of charge/discharge cycles for cells containing composite anodes D (containing the powder of relatively large particles), E and F. It can be seen that composite anodes E and F comprising pillared particles with at least one dimension less than 10 μm and a D10 value of less than 10 μm provide more charge/discharge cycles than composite anode D comprising larger pillared particles.

Example 2

Metallurgical grade silicon powders with different size distributions available from Elkem as Silgrain HQ were etched to form pillared particles using the method described above under "Pillared Particle Formation". Cells were formed substantially as described above under "Electrode and cell fabrication". Details of the materials and cells are set out in Table 2.

TABLE 2

| Powder Product | D10/50/90 of the product (microns) | BET ($m^2$/g) | PMF (%) | BET/PMF | Discharge capacity at 2 C as a % of capacity at C/5 |
|---|---|---|---|---|---|
| E | 13/20.6/32.1 | 32 | 20 | 1.6 | 75% |
| F | 6.6/11.4/19.6 | 10 | 24 | 0.42 | 86.3% |

Powder E has a D10 value that is greater than 10 microns, whereas powder F has a D10 value below 10 microns.

Figure 11:
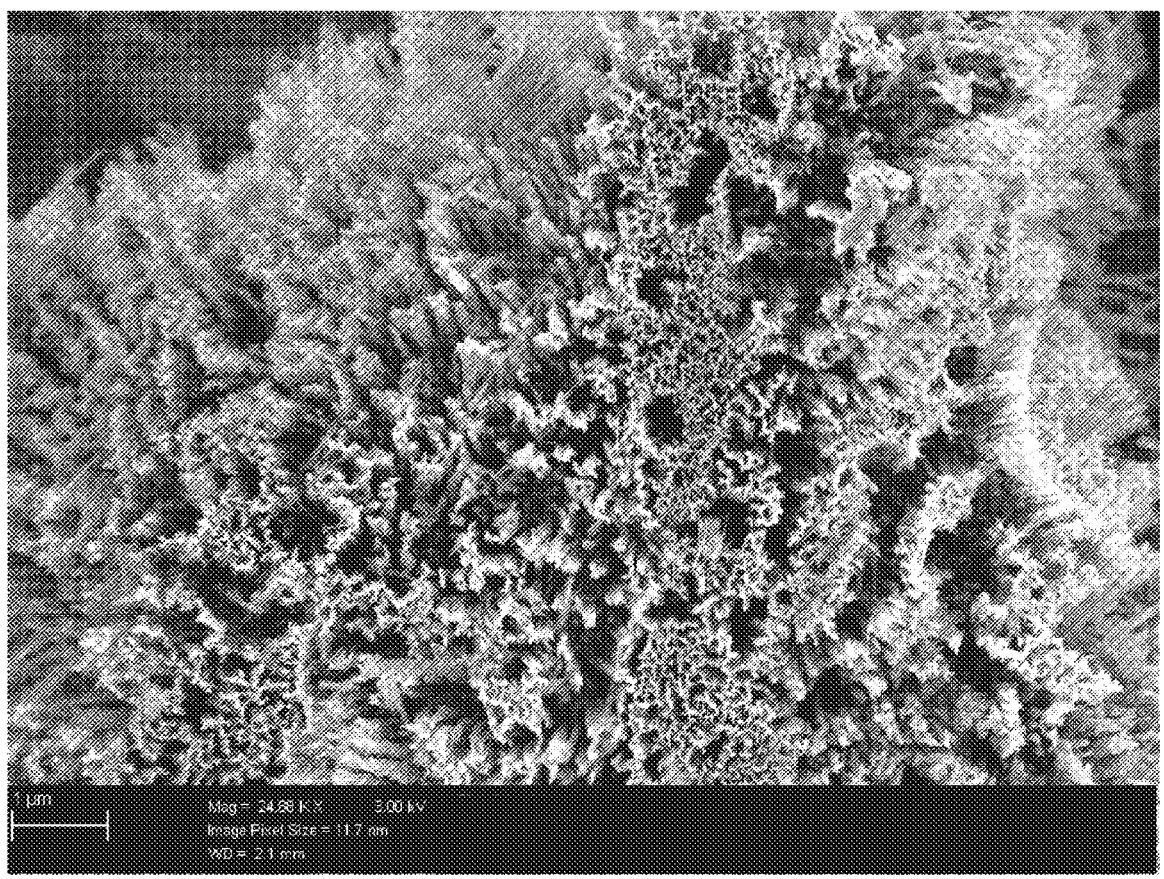
FIG. 11 is a SEM image of pillars of a pillared particle.

FIG. 11 is a SEM image of pillars of a pillared particle formed by etching the starting material used to form Powder F.

The discharge capacity at 2C (full discharge in 30 minutes) as a percentage of the discharge capacity at C/5 (full discharge over a period of 5 hours) is higher for the smaller particles of Powder E than for Powder E.

Figure 12:
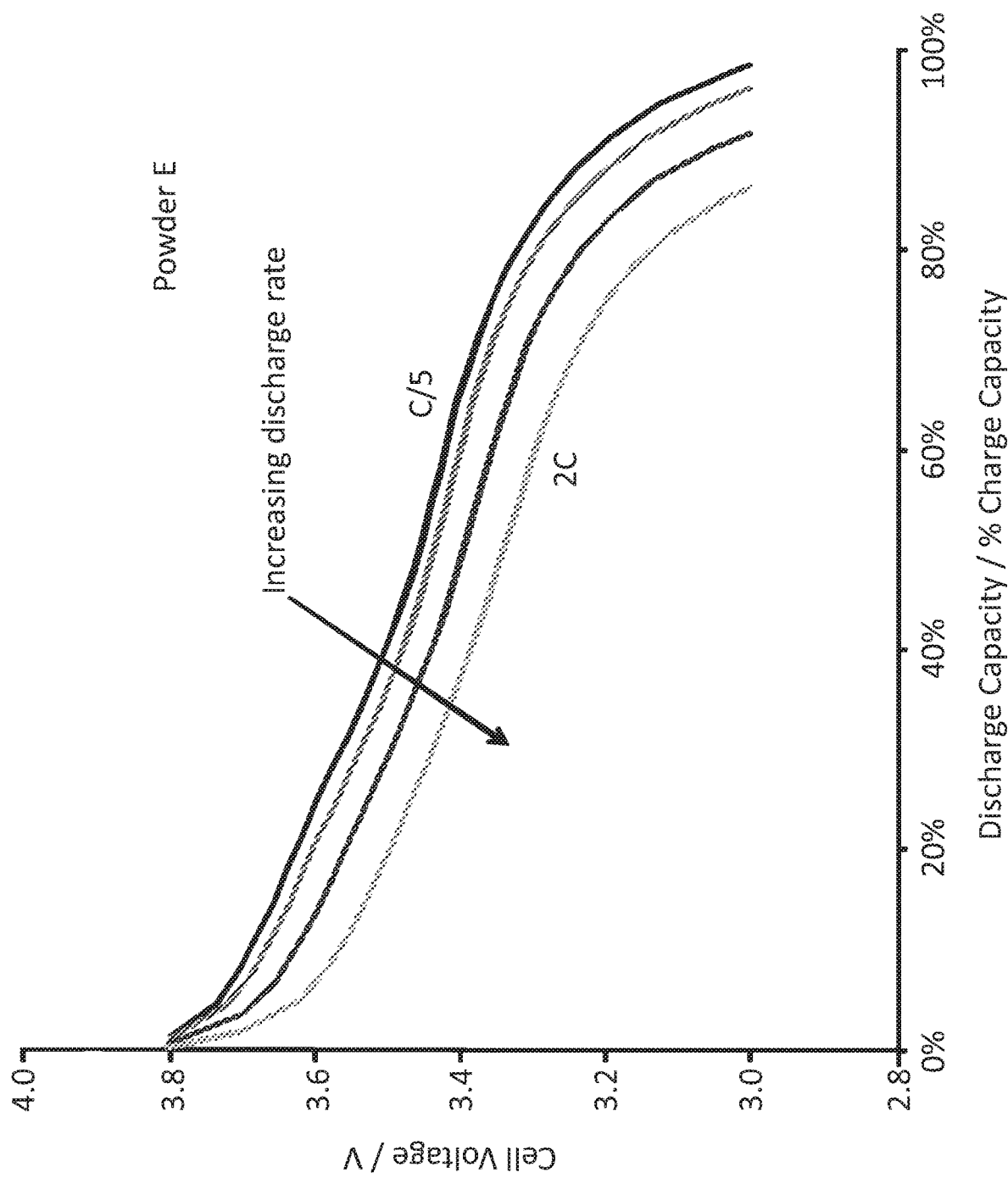
FIG. 12 is a plot of cell voltage against discharge capacity/charge capacity for a lithium ion cell containing relatively small pillared particles at a range of discharge rates.
Figure 13:
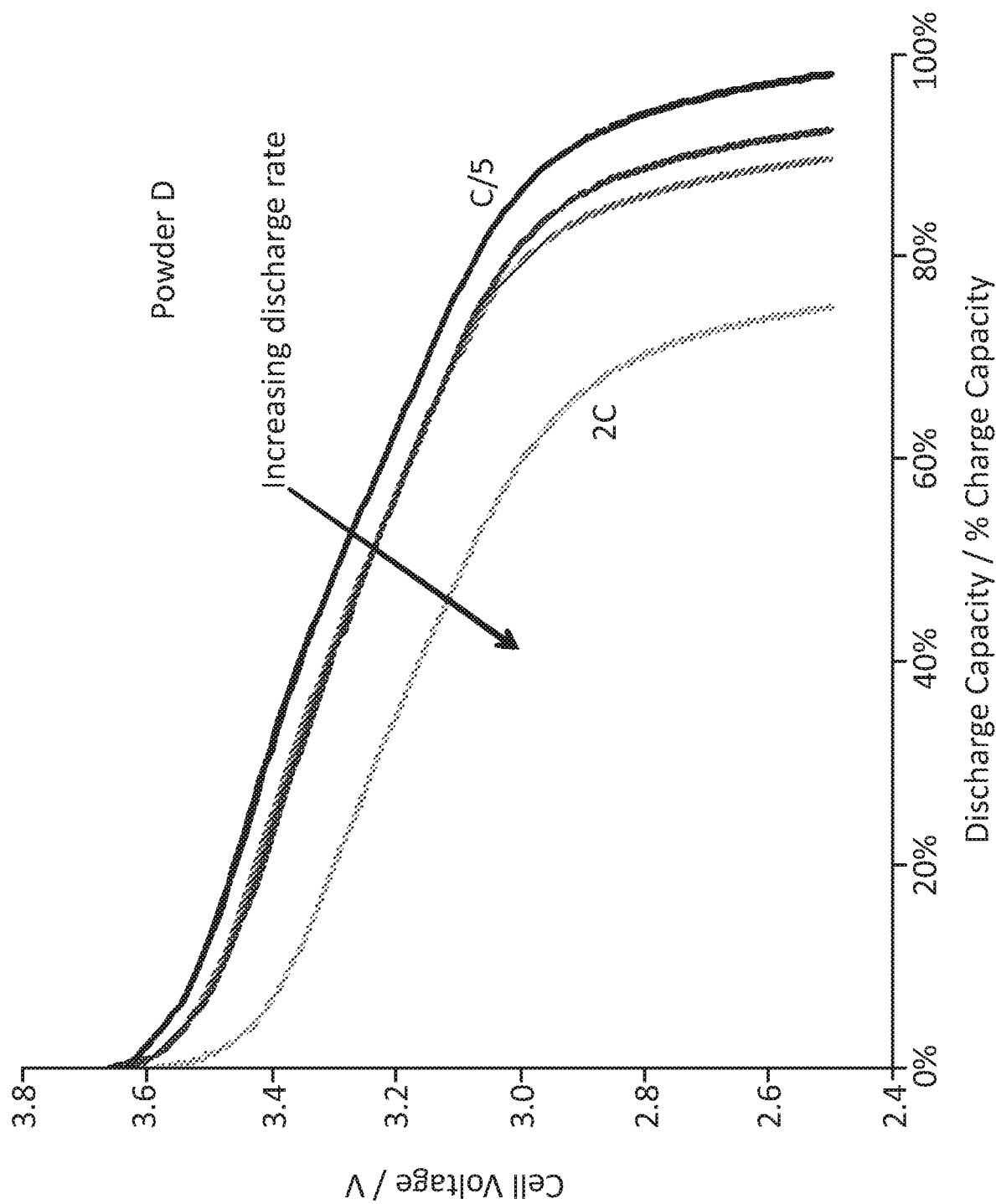
FIG. 13 is a plot of cell voltage against discharge capacity/charge capacity for a lithium ion cell containing relatively large pillared particles at a range of discharge rates.

Cells formed from powders E and F were each charged at a rate C/2 to full capacity and discharged at rates C/5, C/2, C and 2C, wherein C is the rate at which full charge or discharge capacity is reached in a time of 60 minutes. With reference to FIG. 12 (Powder F cell) and FIG. 13 (Powder E cell), the discharge capacity/charge capacity ratio is higher for the cell containing the smaller Powder F, particularly at higher discharge rates. This demonstrates that the cell comprising the smaller pillared particles with a BET/PMF ratio less than 1.5 have a better rate performance than the cell comprising the larger particles.

Example 3

In order to assess the effect of silicon particle size on cell expansion, half cells were made having an composite electrode containing silicon powder, lithium foil as the counter electrode and a liquid electrolyte. The silicon containing composite electrodes were made as described above. The electrolyte was as described in example 1. The increase in the thickness of the silicon-containing composite electrode layer (excluding the current collector) was measured as the cell was charged (first cycle) with an El-Cell® Electrochemical Dilatometer ECD-nano placed inside a temperature controlled chamber at 20° C.

The electrodes contained 70:14:16 weight % silicon particles:NaPAA binder:carbon additives. The carbon additives were a mixture of graphite flakes and conductive carbon such as carbon black. Each electrode contained different silicon material as described below in Table 3: Powder products G, and H were pillared particles made by etching silicon starting material powders as used for powders A and B respectively. Powder product J was pillared particles made by etching the same starting material as used for Powder Product D. Powders Hb and Jb were non-pillared particles, being samples of the same starting materials used for Powder Products H and J respectively, but remaining unetched.

Results are shown in Table 3. Capacities are per gram of silicon.

of faces and all, some or only one of these faces may carry pillars. It will further be understood that the powders may contain particles on which no pillars have formed, although preferably at least 50%, at least 75% or at least 90% of particles of a powder of pillared particles (as observed by SEM) carry pillars.

Figure 15:
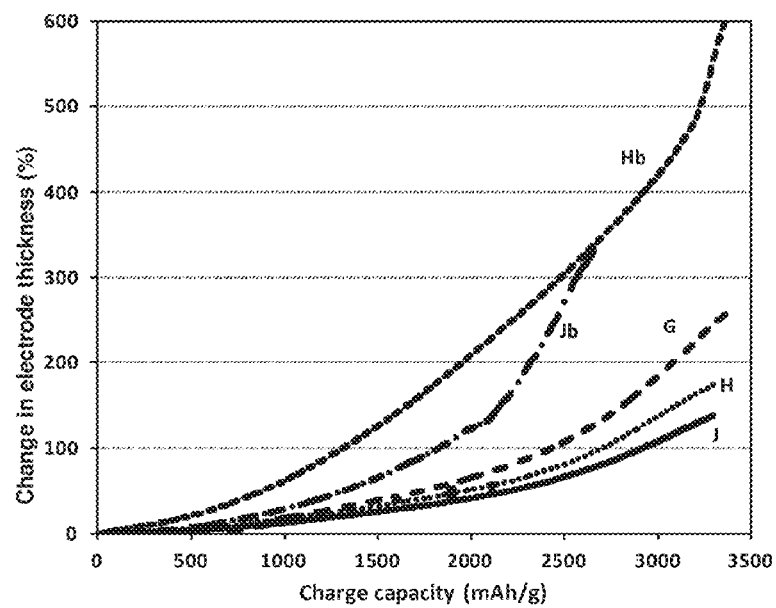
FIG. 15 is a plot of charge capacity against cell electrode thickness change for lithium ion cells containing a range of pillared particle sizes and for cells containing particles that do not carry pillars.

With reference to FIG. 15 and Table 3, the thickness of the electrodes containing the starting materials expands to a much greater degree than those containing pillared products formed from the starting material. Moreover, Powders H and J, which both have a D10 value below 10 microns, expand less than Powder G, which has a D10 value above 10 microns.

Example 4

The starting material is silicon flakes of average thickness 5 μm and width/length dimensions of about 10 μm, made from metallurgical grade silicon or doped silicon wafer. The flakes are etched to produce silicon pillars (nanowires) on both major surfaces of each flake, the pillars having an average diameter of 80 nm, length of 1.5-2 μm and a average pillar density of 10 to 40% or 20 to 40%. The remaining particle core has a thickness of 1-2 μm.

The pillared particles thus produced have a PVF (=PMF) value of 25-70%, a BET value of 5-30 m$^2$/g and an etching yield of 10-40%. The low value of the particle core thickness enables substantial lithiation of the core without fracture, enhancing the overall specific charge capacity of the particle and the high aspect ratio shape enables a good balance to be obtained between Pillar Volume Fraction and Yield. In particular, a yield of >30% combined with a PVF (and PMF) of >30% is achieved for flakes with an average pillar density of 40% and pillars of length 1.5 μm. A plurality of such pillared particles may be comprise 60-80 wt % of a composite anode, with 8-20 wt % of a polymer binder, 0-20 wt % graphite particles and 5-20 wt % conductive (non active) carbon additives, such that the sum of the component percentages adds up to 100%. Because such a composite has a very high capacity then a thin composite layer, e.g. less than 25 μm, may be necessary to match the anode to the cathode (for example the thickness of the cathode layer may be determined such that it has discharge capacity that is 10-25% in excess of that of the anode layer to increase the number of cycles that can be achieved). The small size of the

TABLE 3

| Powder Product | D10/50/90 of product | BET (m2/g) | PMF (%) | BET/ PMF | Electrode coating porosity | % expansion in electrode thickness | | |
|---|---|---|---|---|---|---|---|---|
| | | | | | | at 1500 mAh/g | at 2,000 mAh/g | at 3,000 mAh/g |
| G | 14.5/23.4/37.6 | 20.2 | 15% | 1.35 | 61% | 39 | 66 | 183 |
| H | 5.9/10.5/18.2 | 49.9 | 33% | 1.5 | 64% | 32 | 52 | 136 |
| J | 2.8/4.6/7.6 | 36.7 | 27% | 1.4 | 57% | 25 | 41 | 108 |
| Hb | 8.2/13.5/21.9 | 0.67 | 0 | | 43% | 125 | 208 | 420 |
| Jb | 2.8/4.6/7.1 | 5.0 | 0 | | 44% | 66 | 122 | 310 |

Figure 14:
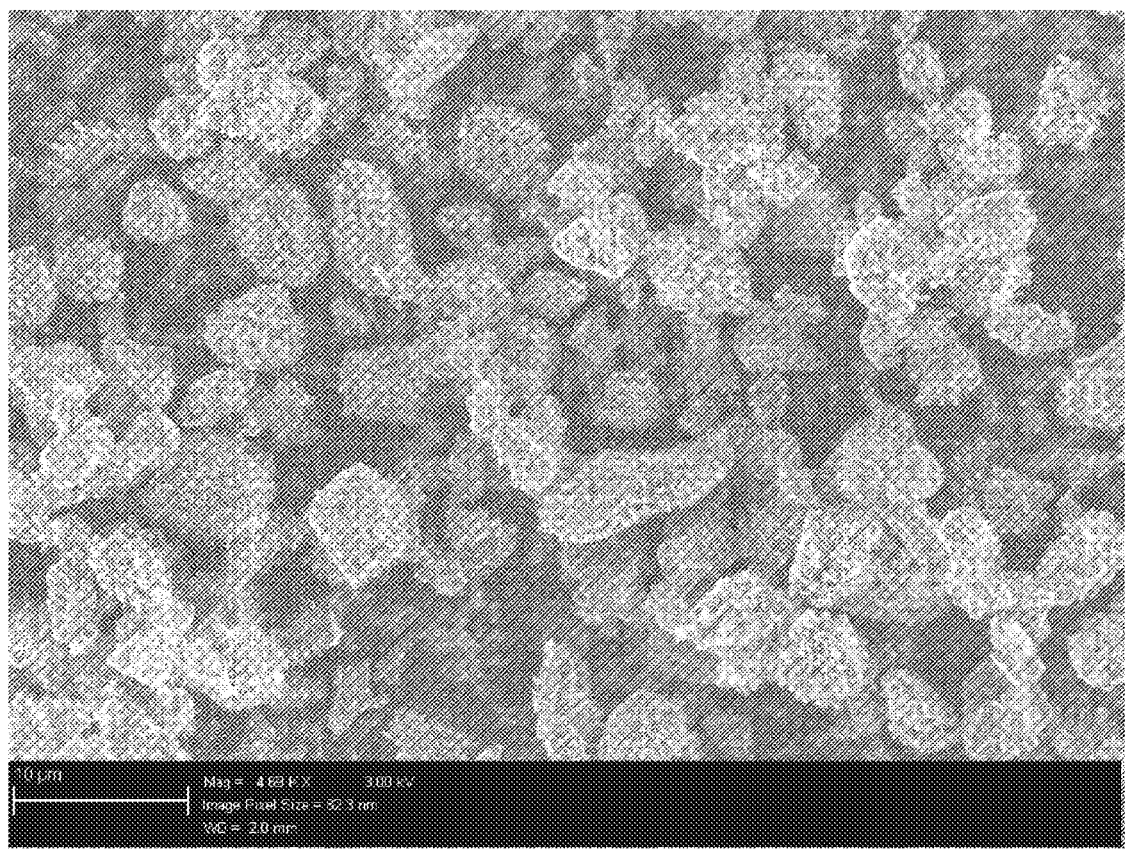
FIG. 14 is a SEM image of pillars of a small pillared particle.

FIG. 14 is a SEM image of a pillared particle powder formed by etching the starting material used to form Powder J, showing this particularly small pillared particle material.

As can be seen in FIG. 14, not all faces of all particle cores carry pillars, and it will be understood that pillared particles as described herein may each have a surface with a plurality pillared particles with at least one dimension less than 10 μm makes it easier to coat such a thin anode layer on the current collector.

To further demonstrate the benefit in yield gained when the pillared particles are made by etching silicon flakes, Table 4 below gives the maximum yield when etching 5 μm thick square silicon flakes of different aspect ratios (the length of the sides of the square divided by 5 μm) to produce particles comprising pillars of height 1.5 μm and diameter 80 nm on the top and bottom surfaces at a density sufficient to produce a PMF of 25%. The BET values will not be strongly affected by the aspect ratio (e.g. for solid pillars with smooth surfaces the BET values for examples 2a to 2d are 5.9 to 6.4, giving a BET/PMF ratio of 0.24-0.27. Rough or porous pillar surfaces will increase the BET accordingly). However as the aspect ratio is increased, the yield increases significantly. Preferably the aspect ratio is at least 1.5:1 with a pillar density of at least 10%.

TABLE 4

| Example | Aspect ratio | Pillar density (%) | Yield (%) |
|---|---|---|---|
| 2a | 1.5 | 12 | 19 |
| 2b | 2 | 14 | 26 |
| 2c | 3 | 17 | 34 |
| 2d | 1 | 7 | 8.5 |

Figure 16A:
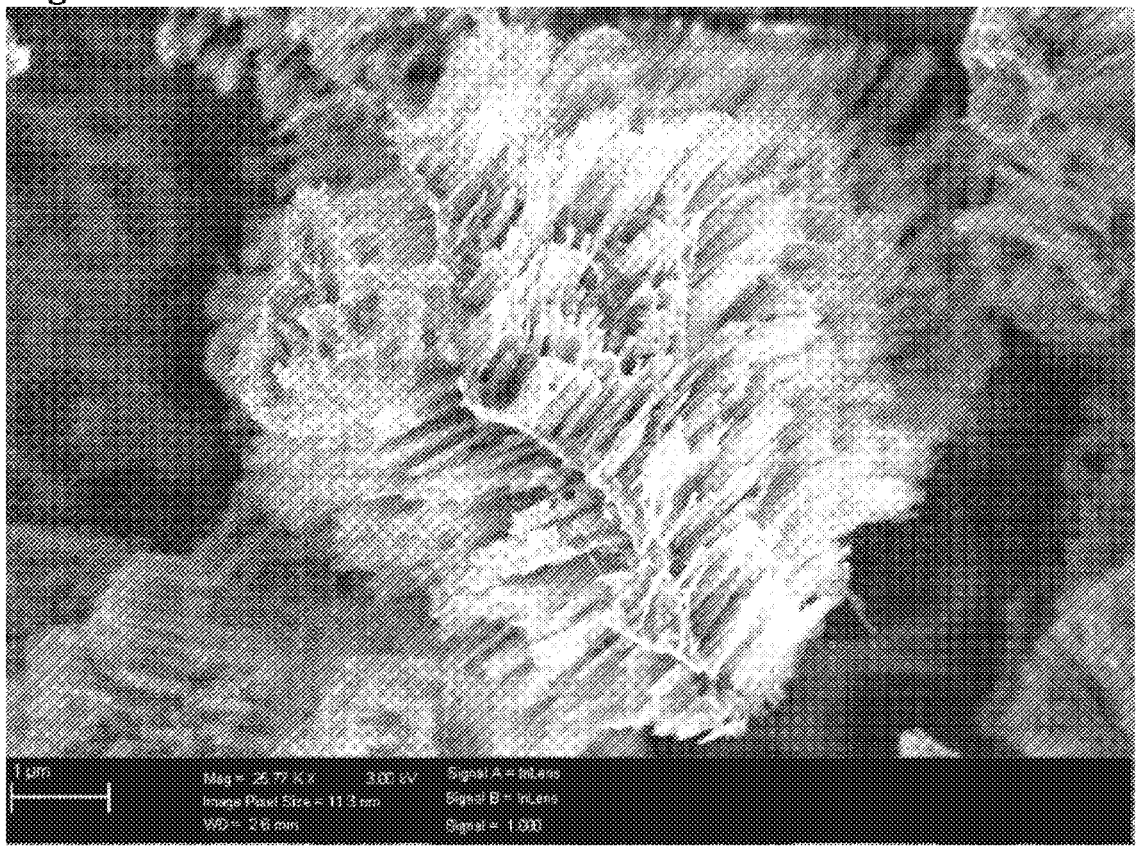
FIG. 16A is a SEM image of a first pillared particle having a high aspect ratio core.

FIG. 16A illustrates a silicon pillared particle having a thin, high aspect ratio core, a BET value of 56 m2/g, a PMF of 33% and a BET/PMF ratio of 1.7.

Figure 16B:
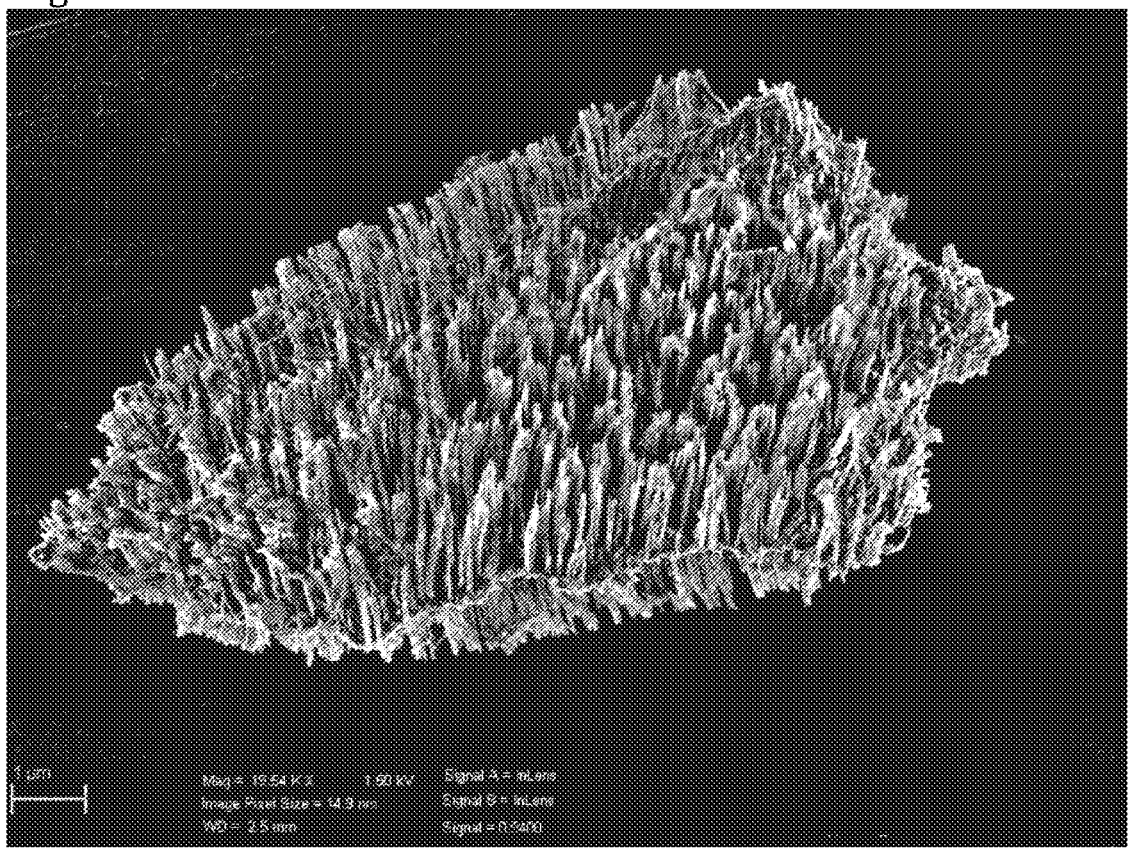
FIG. 16B is a SEM image of a second pillared particle having a high aspect ratio core.

FIG. 16B illustrates a silicon pillared particle having a thin, high aspect ratio core, a BET value of 13 m2/g, a PMF of 21% and a BET/PMF ratio of 0.62. Pillar length is about 1.5 microns.

Example 5

The pillared particles described in example 2 may also be used as a high capacity active additive to a graphite based anode composite. Whilst the charge capacity per unit volume of such a cell may be less than one where the majority of the anode active material is silicon comprising, for certain cell designs it may make matching of the electrodes easier since thicker coatings can be used for the composite anode. When silicon comprising particles are used as additives in a composite where the majority of the active material is graphite, because of the different electrochemical potentials of graphite and silicon, the silicon comprising particles may be fully lithiated before lithiation of the graphite is initiated, therefore it is advantageous if both the core and the pillars of the pillared particles can be substantially fully lithiated over many cycles without degradation. A plurality of pillared particles described in example 2 may be comprise 5-25 wt % of a composite anode, with 8-20 wt % of a polymer binder, 50-80 wt % graphite and/or graphene particles and 5-20 wt % conductive (non active) carbon additives, such that the sum of the component percentages adds up to 100%.

Example 6

The starting material is graphite and/or conductive carbon particles with at least one smaller dimension less than 8 μm, preferably around 5 μm and dimensions orthogonal to the smaller dimension of no more than 20 μm. The starting material has a D10 value less than 10 μm as measured on a powder sample dispersed in water by a Malvern Mastersizer system.

The graphite particles are placed on a substrate and coated with Au, Ni or Sn catalyst particles. Silicon nanowires are grown on the exposed surfaces of the graphite at points where the catalyst particles are located via CVD-assisted VLS process (for example PECVD, LPCVD or PPCVD systems may be used). The silicon nanowires have diameters of 30-60 nm and lengths of at least 4 μm, for example between 4 and 10 μm long. The surface of the graphite/carbon particles in contact with the substrate may not be covered with pillars. Alternatively the starting material can be coated with catalyst particles from solution and the nanowires grown in a fluidised bed reactor to form pillars on all surfaces of the particle core. The pillared particles are removed from the substrate (or reactor) for testing or added to a slurry for making a composite anode layer. The pillared particles have a PVF value of 5-15% and the BET value is less than 30 m²/g, the average pillar density is 0.5-5%. A composite anode material comprises a mixture of the pillared particles, a binder and additional conductive additives (e.g. carbon) with respective mass percentages of 65-85 wt % pillared particles, 8-15 wt % binder and 5-20 wt % conductive additives, such that the sum of the component percentages adds up to 100%. Such a mix would comprise 3-13 wt % of active silicon material and 55-80 wt % of active graphite material. Alternatively, some of the pillared particles could be replaced by bare graphite particles whilst still maintaining the mass percentage of silicon and graphite within these ranges.

Example 7

The pillared particles are made as described in example 5 except some or all of the graphite particles are replaced by graphene particles comprising at least 4 graphene sheets. The graphene particles have a high aspect ratio with a thickness less than 1 μm and length/width dimensions less than 15 μm. Preferably the BET value of the graphene particles is less than 200 m²/g, more preferably less than 100 m²/g. As well as providing a significantly higher conductivity (lower resistivity), the thinner core means that longer pillars can be grown whilst maintaining the D10 value of less than 10 μm and increasing the PVF value (i.e. increasing the specific charge capacity), for example in excess of 40%. However the higher BET value of the graphene core pillared particles may increase the first cycle loss and it is preferable to mix graphite core pillared particles with graphene core pillared particles in the ratio 9:1 to 7:3. The composite anode mix comprises 8-15 wt % binder, 5-20 wt % conductive additives, 5-20 wt % silicon and 50-80 wt % graphite and/or graphene, such that the sum of the component percentages adds up to 100%.

Example 8

Pillared particles were prepared as described above under "Pillared Particle Formation" using powders available from Elkem of Norway. Cells were prepared as described above under "Cell Construction and Testing".

Properties of the pillared particles are set out in Tables 5A and 5B

TABLE 5A

| Product | Pillared particle D10/50/90 | BET (m²/g) | PMF (%) | BET/ PMF | Cycles to 80% capacity |
|---|---|---|---|---|---|
| Powder K | 2.6/4.5/8.2 | 25.2 | 30 | 0.84 | 319 |
| Powder L | 2.8/4.6/7.6 | 36.7 | 30 | 1.22 | 361 |
| Powder M | 6.5/10.7/17.5 | 26.9 | 28 | 0.96 | 279 |
| Powder N | 6.3/10.9/18.7 | 14.6 | 21 | 0.7 | 289 |
| Powder O (Comparative Example) | 2.5/4.7/9.6 | 40.3 | 0 | ∞ | 184 |

TABLE 5B

| Product | Pillared particle D10/50/90 | BET (m²/g) | PMF | BET/PMF | Cycles to 4.3 V end of charge voltage | FCL (%) | Average eff % (cycles 3-end) |
|---|---|---|---|---|---|---|---|
| Powder P | 6.3/10.9/18.9 | 30 | 22 | 1.4 | 256 | 25 | 99.47 |
| Powder Q | 6.2/11.1/19.9 | 51 | 14 | 3.6 | 127 | 41 | 99.37 |

In the above table, FCL is first cycle loss, which represents the irreversible loss of lithium during the first charge/discharge cycle as a percentage for the charge capacity in the first cycle. Some of the lithium loss can be attributed to the cathode (positive electrode) whilst the remainder results from the formation of the SEI layer on the surface of the electroactive material in the negative electrode during the first charge cycle.

Cells containing Powders K-O were cycled between fixed upper and lower cell voltage limits corresponding to a charging capacity of approximately 900 mAh/g of silicon.

Powders K and L are smaller than powders M and N, and maintain a capacity above 80% of a starting capacity for more cycles than larger powders M and N.

Figure 17:
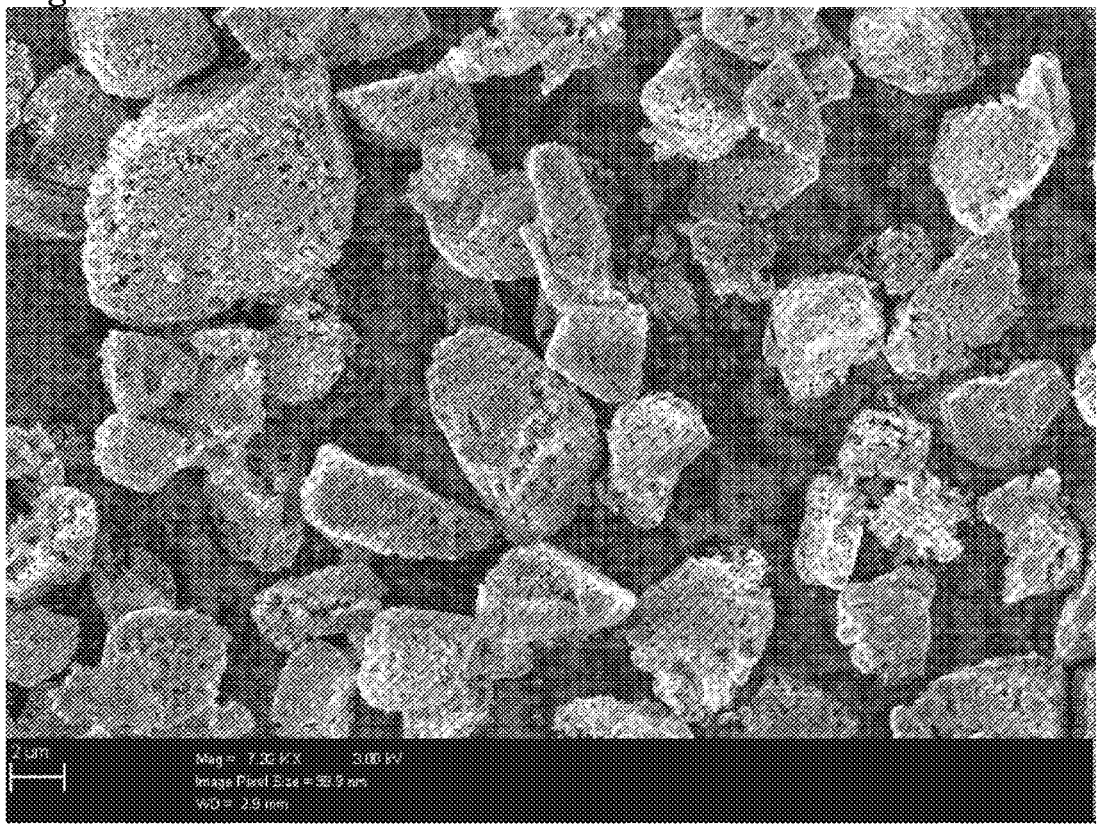
FIG. 17 is a SEM image of a powder containing etched silicon that does not carry pillars.

For the purpose of comparison, a powder M was prepared in which the density of silver nucleation was controlled to form interconnected pores extending into a surface of the silicon starting material rather than pillars extending from an etched surface of the silicon. FIG. 17 is a SEM image of Powder M, showing pores extending into the surface of the silicon rather than discrete pillars extending from the surface of a silicon core on the majority of core surfaces.

It can be seen that the performance of Powder M is significantly worse than any of powders K-N containing pillared particles.

Cells containing powders P and Q were cycled at a constant capacity of 1200 mAh/g of silicon until the end of discharge voltage reached 4.3V, at which point a capacity of 1200 mAh/g can no longer be maintained. With reference to powders P and Q, it can be seen that powder P, having a BET/PMF ratio of 1.4, can be cycled at a capacity of 1200 mAh/g for twice the number of cycles as powder Q, which has a BET/PMF ratio above 3.

Figure 18:
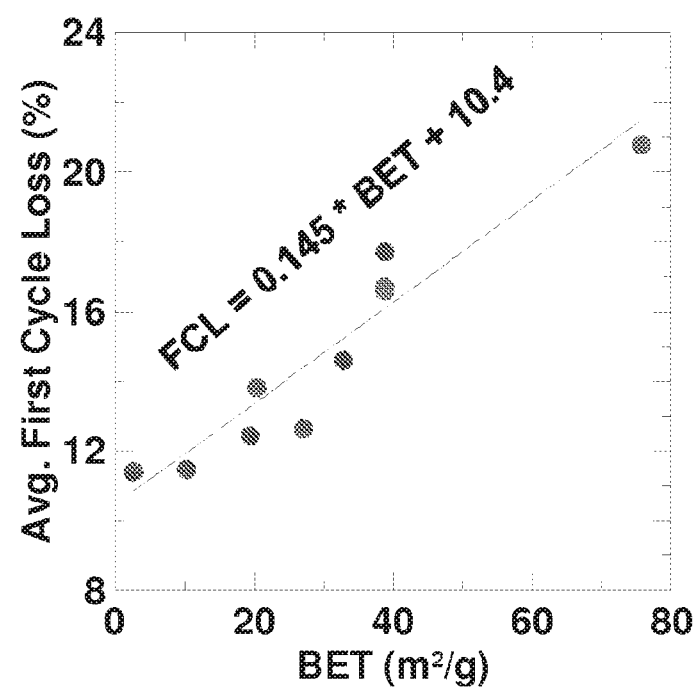
FIG. 18 is a plot of BET vs average first cycle loss for etched silicon pillared particles.

With reference to FIG. 18, the present inventors have found a linear relationship between first cycle loss and BET for etched silicon pillared particles. Without wishing to be bound by any theory, it is believed that if the surface area per unit mass is too large then the charge capacity per unit mass and/or cycle life may be reduced through excessive formation of oxide and/or SEI layer on the surface of the active material. The present inventors have found that the non-linear relationship between BET and PMF is such that the preferred BET/PMF ratio below 3.

Example 9

Pillared particles, composite electrodes containing the particles and cells containing the electrodes were prepared and tested as in Example 8, except that the cells were lithiated and delithiated to maximum charge/discharge capacity at each cycle rather than between fixed upper and lower voltage limits or at fixed charge capacities (as in previous examples) in order to maximise mechanical stress of the active silicon as both the cores and pillars are fully lithiated.

Results are provided in Table 6.

TABLE 6

| Pillar Product | D10/50/90 | BET (m²/g) | PMF (%) | BET/PMF | Cycles to 60% initial capacity ($2^{nd}$ cycle) | Cycles to 70% initial capacity ($2^{nd}$ cycle) | Initial capacity ($2^{nd}$ cycle) mAh/g | FCL (%) | Av. Eff from $3^{rd}$ cycle to end |
|---|---|---|---|---|---|---|---|---|---|
| O (Comp. Example) | 2.5/4.7/9.6 | 40.3 | 0 | ∞ | 60 | 43 | 3660 | 14 | 99.06 |
| S | 2.8/4.6/7.8 | 14 | 37 | 0.64 | 215 | 133 | 3706 | 13 | 99.40 |
| T | 2.8/4.6/7.4 | 18.9 | 42 | 0.7 | >250 | 84 | 3341 | 12 | 99.17 |
| U | 2.6/4.6/7.3 | 23 | 41 | 0.88 | 272 | 163 | 2263 | 17 | 98.65 |
| V | 2.6/4.3/6.9 | 16.9 | 29 | 0.83 | 226 | 118 | 2968 | 13 | 99.19 |
| W | 6.9/11.3/18.4 | 19.3 | 33 | 0.92 | 130 | 38 | 2919 | 10 | 99.36 |

For the purpose of comparison, Powder O was used. As described above, the density of silver nucleation was controlled to form Powder O containing particles of interconnected pores extending into a surface of the silicon starting material rather than pillars extending from an etched surface of the silicon.

Figure 19:
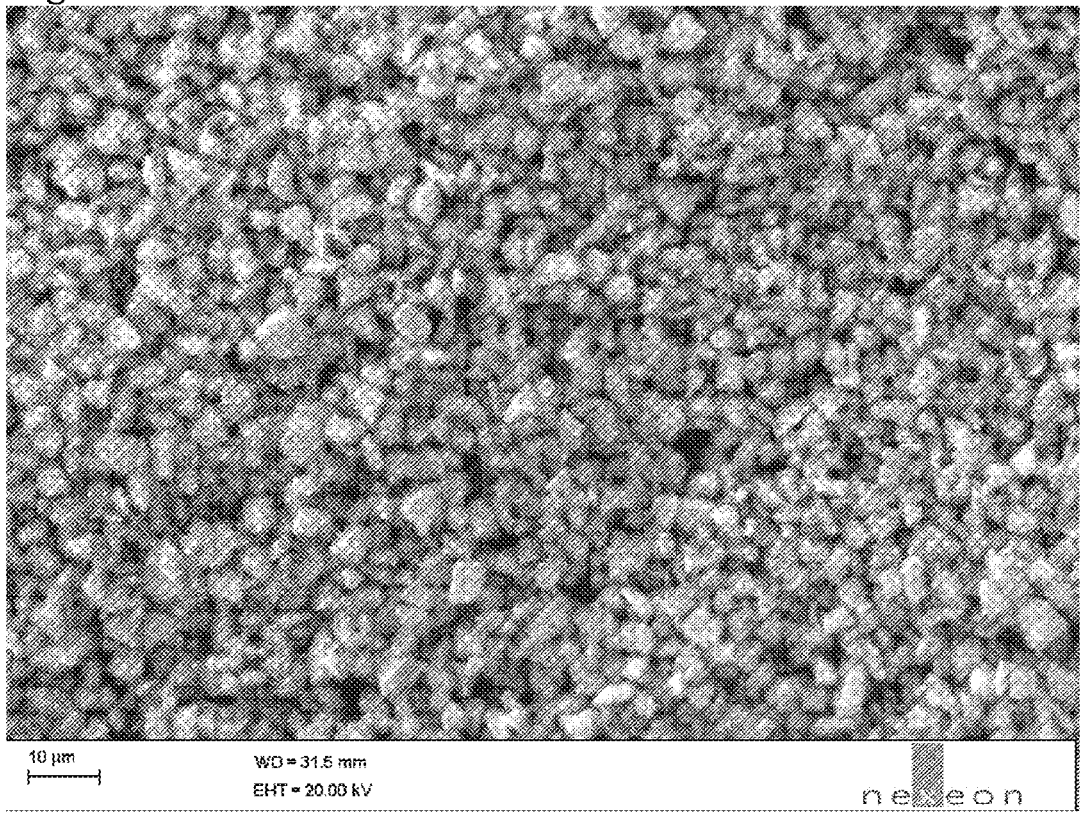
FIG. 19 is a SEM image of a powder containing pillared silicon particles.

FIG. 19 is a SEM image of Powder S, showing pillars extending from the particle core.

As with Example 6, the porous, non-pillared particles (Powder O) provide substantially worse performance than the pillared particle.

Although the number of cycles to fall to 70% initial capacity for Powder W is smaller than for non-pillared powder O, the number of cycles to fall to 60% capacity is much higher for pillared Powder W. Without wishing to be bound by any theory, it is believed that this relatively short number of cycles to fall to 70% capacity is due to lithiation of the core of the relatively large particle of Powder W.

Example 10

Pillared particles were prepared and devices were prepared and tested as in Example 8 with the cells being cycled at a fixed capacity of 1200 mAh/g silicon. Pillared particles having different BET/PMF ratios were prepared from the same starting material as used for powder B.

As shown in Table 7, average efficiency over the third to fiftieth charge-discharge cycles is higher, and first cycle capacity loss is lower, for pillared powders Y and Z, which have a BET/PMF ratio below 3 as compared to powder X which has a BET/PMF ratio above 3.

TABLE 7

| Pillared product | BET (m²/g) | Corrected PMF (%) | BET/PMF | FCL (%) | Average efficiency over 3-50 cycles |
|---|---|---|---|---|---|
| X | 75 | 24 | 3.125 | 21% | 99.63% |
| Y | 38.4 | 22 | 1.74 | 17% | 99.76% |
| Z | 9.3 | 23 | 0.4 | 11.5% | 99.87% |

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A powder comprising a plurality of pillared particles for use as an active component of a metal ion battery, the pillared particles comprising a particle core and a plurality of elongated structures extending from the particle core, wherein the elongated structures comprise at least one of silicon, tin, and germanium,
   wherein a BET value of the pillared particles is 1-200 m²/g,
   wherein a pillar mass fraction (PMF) of the pillared particles is in a range of 5-80%, wherein PMF=[(Total mass of elongated structures extending from the particle core)/(Total mass of pillared particle)]×100%,
   wherein an average density of the elongated structures extending from the particle core is in a range of 1-80%, wherein average density of the elongated structures is given by the formula A/(A+B)×100% wherein A is the area of a surface of the particle core occupied by elongated structures and B is the area of the surface that is unoccupied by elongated structures; and
wherein a mean average thickness of the elongated structures is in a range of 10-250 nm.

2. The powder according to claim 1, wherein the PMF is in a range of 10-80%.

3. The powder according to claim 1, wherein the PMF is in a range of 20-60%.

4. The powder according to claim 1, wherein the average density of the elongated structures extending from the particle core is in a range of 1-60%.

5. The powder according to claim 1, wherein the average density of the elongated structures extending from the particle core is in a range of 10-50%.

6. The powder according to claim 1, wherein the mean average thickness of the elongated structures is in a range of 10-150 nm.

7. The powder according to claim 1, wherein the mean average thickness of the elongated structures is in a range of 10-80 nm.

8. The powder according to claim 1, wherein the BET value of the pillared particles is 5-100 m²/g.

9. The powder according to claim 1, wherein the BET value of the pillared particles is 5-100 m²/g, the average density of the elongated structures extending from the particle core is in a range of 1-60%, and the PMF is in a range of 20-60%.

10. The powder according to claim 1, wherein the pillared particles have at least one dimension that is less than 10 microns.

11. The powder according to claim 1, wherein at least 10% of a total volume of the powder is made up of particles having a particle size of no more than 10 microns.

12. The powder according to claim 1, wherein the volume of the elongated structures is at least 20% of the total volume of the pillared particles.

13. The powder according to claim 1, wherein an average length of the elongated structures is less than 10 microns.

14. The powder according to claim 1, wherein an average length of the elongated structures is less than 5 microns.

15. The powder according to claim 1, wherein the elongated structures comprise silicon.

16. The powder according to claim 1, wherein the elongated structures do not comprise carbon.

17. The powder according to claim 1, wherein the elongated structures are spaced apart from one another.

18. The powder according to claim 1, wherein the particle core comprises an electroactive material comprising one or more of graphite, graphene, hard carbon, silicon, germanium, gallium, tin, aluminium, lead, indium, antimony, bismuth, oxides, nitrides or hydrides thereof, mixtures of these, mixtures or composite alloys containing these elements and chalcogenides and ceramics that are electrochemically active.

19. The powder according to claim 1, wherein the particle core comprises carbon.

20. The powder according to claim 1, wherein the particle core comprises a material selected from the group consisting of hard carbon, graphite, and graphene.

21. The powder according to claim 1, wherein opposing surfaces of the pillared particles carry elongated structures.

22. The powder according to claim 1, wherein only one of two opposing surfaces of the pillared particles carries elongated structures.

23. The powder according to claim 1, wherein the pillared particles are substantially discrete from one another.

24. A composition comprising a powder according to claim 1, and further comprising at least one of:
   (i) at least one further active component;
   (ii) at least one conductive, non-active component;
   (iii) a binder; and
   (iv) a solvent.

25. A composite electrode comprising a powder according to claim 1, further comprising at least one of:
   (i) at least one further active component;
   (ii) at least one conductive, non-active component; and
   (iii) a binder.

* * * * *